(12) United States Patent
Walton

(10) Patent No.: US 11,830,153 B2
(45) Date of Patent: *Nov. 28, 2023

(54) GENERATING AN AUGMENTED REALITY IMAGE USING A BLENDING FACTOR

(71) Applicant: Imagination Technologies Limited, Kings Langley (GB)

(72) Inventor: David Walton, Sutton Coldfield (GB)

(73) Assignee: Imagination Technologies Limited, Kings Langley (GB)

( * ) Notice: Subject to any disclaimer, the term of this patent is extended or adjusted under 35 U.S.C. 154(b) by 72 days.

This patent is subject to a terminal disclaimer.

(21) Appl. No.: 17/397,092

(22) Filed: Aug. 9, 2021

(65) Prior Publication Data

US 2021/0366200 A1 Nov. 25, 2021

Related U.S. Application Data

(63) Continuation of application No. 16/794,041, filed on Feb. 18, 2020, now Pat. No. 11,087,554, which is a
(Continued)

(30) Foreign Application Priority Data

Jun. 17, 2016 (GB) ...................................... 1610657

(51) Int. Cl.
*G06T 19/00* (2011.01)
*G06T 15/50* (2011.01)
(Continued)

(52) U.S. Cl.
CPC .............. *G06T 19/006* (2013.01); *G06T 7/30* (2017.01); *G06T 15/503* (2013.01); *G06V 20/64* (2022.01); *G06T 3/4038* (2013.01)

(58) Field of Classification Search
CPC ....... G06T 19/006; G06T 7/30; G06T 15/503; G06T 3/4038
See application file for complete search history.

(56) References Cited

U.S. PATENT DOCUMENTS 6,445,816 B1    9/2002   Pettigrew
2002/0150307 A1  10/2002  Hamburg
(Continued)

FOREIGN PATENT DOCUMENTS

WO       2015/082015 A1    6/2015

OTHER PUBLICATIONS

Cheng et al., "Global Contrast based Salient Region Detection," http://vecg.cs.ucl.ac.uk/Projects/SmartGeometry/contrast_saliency/paper_docs/, Department of Computer Science, Virtual Environments and Computer Graphics, University College London (2011).
(Continued)

*Primary Examiner* — James A Thompson
*Assistant Examiner* — Kim Thanh T Tran
(74) *Attorney, Agent, or Firm* — Potomac Law Group, PLLC; Vincent M DeLuca

(57) ABSTRACT

A method for generating an augmented reality image from first and second images, wherein at least a portion of at least one of the first and the second image is captured from a real scene, identifies a confidence region in which a confident determination as to which of the first and second image to render in that region of the augmented reality image can be made, and identifies an uncertainty region in which it is uncertain as to which of the first and second image to render in that region of the augmented reality image. At least one blending factor value in the uncertainty region is determined based upon a similarity between a first colour value in the uncertainty region and a second colour value in the confidence region, and an augmented reality image is generated
(Continued)

| 0 | 0 | 0 | 0 | 0 | 0 | 0 | 0 | 0 | 0 | 0 |
|---|---|---|---|---|---|---|---|---|---|---|
| 0.35 | 0.4 | 0.45 | 0.4 | 0.35 | 0.35 | 0.35 | 0 | 0 | 0 | 0 |
| 0.55 | 0.65 | 0.7 | 0.6 | 0.55 | 0.55 | 0.4 | 0 | 0 | 0 | 0 |
| 0.8 | 0.85 | 0.9 | 0.9 | 0.8 | 0.65 | 0.4 | 0 | 0 | 0 | 0 |
| 1 | 1 | 1 | 1 | 0.9 | 0.7 | 0.45 | 0 | 0 | 0 | 0 |
| 1 | 1 | 1 | 1 | 0.85 | 0.65 | 0.4 | 0 | 0 | 0 | 0 |
| 1 | 1 | 1 | 1 | 0.8 | 0.6 | 0.35 | 0 | 0 | 0 | 0 |

1400, 1410 by combining, in the uncertainty region, the first and second images using the at least one blending factor value.

20 Claims, 14 Drawing Sheets

Related U.S. Application Data continuation of application No. 15/623,690, filed on Jun. 15, 2017, now Pat. No. 10,600,247.

(51) Int. Cl.
*G06V 20/64* (2022.01)
*G06T 7/30* (2017.01)
*G06T 3/40* (2006.01)

(56) References Cited

U.S. PATENT DOCUMENTS

| | | |
|---|---|---|
| 2003/0133602 A1 | 7/2003 | Bani-Hashemi |
| 2005/0231511 A1 | 10/2005 | Doepke et al. |
| 2007/0132777 A1 | 6/2007 | Miyagi et al. |
| 2010/0061658 A1* | 3/2010 | Yamada ................. G06T 7/194 382/282 |
| 2010/0080448 A1* | 4/2010 | Tam ..................... H04N 13/261 382/167 |
| 2010/0128923 A1 | 5/2010 | Kiya et al. |
| 2011/0038536 A1 | 2/2011 | Gong |
| 2011/0051005 A1* | 3/2011 | Wu ....................... H04N 5/213 348/E5.078 |
| 2012/0026190 A1 | 2/2012 | He et al. |
| 2012/0075341 A1* | 3/2012 | Sandberg ............... G06F 3/147 345/633 |
| 2012/0075484 A1 | 3/2012 | Kawamoto et al. |
| 2012/0206452 A1 | 8/2012 | Geisner et al. |
| 2013/0063486 A1 | 3/2013 | Braun et al. |
| 2013/0083064 A1 | 4/2013 | Geisner et al. |
| 2014/0098100 A1 | 4/2014 | Dane et al. |
| 2014/0169666 A1* | 6/2014 | Hong ..................... G06T 11/60 382/162 |
| 2014/0176757 A1 | 6/2014 | Rivard et al. |
| 2014/0354690 A1 | 12/2014 | Walters et al. |
| 2015/0091900 A1* | 4/2015 | Yang ................... G06V 40/162 345/419 |
| 2015/0205501 A1* | 7/2015 | Fujii .................. G06F 3/04883 715/763 |
| 2015/0207999 A1* | 7/2015 | Han ................... H04N 5/23229 348/240.3 |
| 2015/0243087 A1 | 8/2015 | Saito |
| 2017/0347044 A1* | 11/2017 | Douady-Pleven .... G06T 3/4038 |

OTHER PUBLICATIONS

Padilha et al., "Motion-Aware Ghosted Views for Single Layer Occlusions in Augmented Reality," 2015 IEEE International Symposium on Mixed and Augmented Reality Workshops, Sep. 29-Oct. 3, 2015.

Fukiage et al., "Reduction of Contradictory Partial Occlusion in Mixed Reality by Using Characteristics of Transparency Perception," IEEE Int'l Symposium on Mixed and Augmented Reality 2012 Science and Technology Proceedings, Nov. 5-8, 2012, Atlanta, Georgia.

* cited by examiner

GENERATING AN AUGMENTED REALITY IMAGE USING A BLENDING FACTOR

CROSS-REFERENCE TO RELATED APPLICATIONS AND CLAIM OF PRIORITY

This application is a continuation under 35 U.S.C. 120 of application Ser. No. 16/794,041 filed Feb. 18, 2020, now U.S. Pat. No. 11,087,554, which is a continuation of prior application Ser. No. 15/623,690 filed Jun. 15, 2017, now U.S. Pat. No. 10,600,247, which claims foreign priority under 35 U.S.C. 119 from United Kingdom Application No. 1610657.7 filed Jun. 17, 2016.

BACKGROUND

In augmented reality (AR) systems, a pair of images may be combined so as to create an augmented reality image in which the content from one image appears to be included in the other image. In some arrangements, an image of a virtual object and an image of a real scene are combined so as to generate an augmented reality image in which it appears to the viewer that the virtual object has been included in the real scene. The augmented reality image may be generated by rendering the virtual object within a portion of the captured real scene. When rendering the virtual object in the scene, the relative depth of the virtual object with respect to the depth of the scene is considered to ensure that portions of the virtual object and/or the scene are correctly occluded with respect to one another. By occluding the images in this way, a realistic portrayal of the virtual object within the scene can be achieved.

Techniques for generating an augmented reality image of a scene typically require the generation of an accurate model of the real scene by accurately determining depth values for the objects within the real scene from a specified viewpoint. By generating an accurate model, it is possible to compare depth values and determine portions of the two images to be occluded. Determining the correct occlusion in an augmented reality image may be performed by comparing corresponding depth values for the image of the virtual object and the image of the real scene and rendering, for each pixel of the scene, a pixel using a colour selected from the colour at that pixel in the image of the virtual object or the real scene based upon which image has the smaller depth value with respect to the specified viewpoint, i.e. is closer to the specified viewpoint.

To avoid potential errors with depth measurements, a scene can be scanned from a number of positions to generate an accurate map of the scene. For example, camera tracking may be performed whilst moving a camera around a scene and capturing a number of different scans or images of the scene. However, such processing is time consuming and processor intensive and is not suited to real-time applications, where the position of objects in the scene may vary or where it may be necessary to update the model of the real scene regularly. For example, in video applications where a constant frame rate is required there may be insufficient time between frames to update a scene model.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One approach for capturing depth information regarding a scene is to make use of a capture device that is configured to capture information relating to both colour and depth, such as an RGBD camera. An RGBD camera is configured to capture Red, Green, and Blue (RGB) colour information as well as depth information, D.

The inventors have recognised that depth information obtained from a single point, for example using such a capture device, may not be complete or the depth information may be imprecise for portions of the captured scene. For example, there may be portions of an image captured by an RGBD camera where a corresponding depth measurement could not have been obtained. This may occur where a surface of an object in the scene is absorptive of the signals used for depth measurement or is positioned at an angle relative to a capture device such that a depth signal is not directed back to a sensor of the capture device with sufficient signal strength for a precise depth measurement to be captured. Similarly, it may be that the depth information is detected but is inaccurate, for example due to signal reflections or interference, which can result in noise in the captured depth measurement.

For time-critical applications, the inventors have recognised that it is sometimes useful to make use of depth data captured at a single point rather than generate a complex model of a scene when generating an augmented reality image. However, the result of errors in the depth information or an absence of depth information for a particular portion of the scene is that, when generating an augmented reality image, erroneous depth comparison results may occur. These erroneous depth comparison results may result in portions of one image being incorrectly rendered or occluded leading to visual artefacts in a resultant rendered augmented reality image.

The present application seeks to address these above problems and to provide an improved approach to generating an augmented reality image.

There is provided a method for generating an augmented reality image from first and second images, wherein at least a portion of at least one of the first and the second image is captured from a real scene, the method comprising: identifying a confidence region in which a confident determination as to which of the first and second image to render in that region of the augmented reality image can be made; identifying an uncertainty region in which it is uncertain as to which of the first and second image to render in that region of the augmented reality image; determining at least one blending factor value in the uncertainty region based upon a similarity between a first colour value in the uncertainty region and a second colour value in the confidence region; and generating an augmented reality image by combining, in the uncertainty region, the first and second images using the at least one blending factor value.

There is provided an augmented reality processing system for generating for generating an augmented reality image from first and second images, wherein at least a portion of at least one of the first and the second image is captured from a real scene, the augmented reality processing system comprising: a confidence identification module arranged to identify a confidence region in which a confident determination as to which of the first and second image to render in that region of the augmented reality image can be made; an uncertainty identification module arranged to identify an uncertainty region in which it is uncertain as to which of the first and second image to render in that region of the augmented reality image; a blend module arranged to determine at least one blending factor value in the uncertainty region based upon a similarity between a first colour value in the uncertainty region and a second colour value in the confidence region; and an image generation module arranged to generate an augmented reality image by combining, in the uncertainty region, the first and second images using the at least one blending factor value.

The first image and the second image may each have associated therewith a plurality of colour values and a corresponding plurality of depth values. The confident determination as to which of the first image and the second image to render based upon a depth value of the first image and the corresponding depth value of the second image in the confidence region may be made as part of the method or processing system. The uncertainty region may be identified based upon at least one depth value associated with at least one of the first and the second image, the at least one depth value being derived from a depth value captured from a real scene. The at least one depth value may be derived from an unreliable or incomplete depth value captured from the real scene. Identifying the uncertainty region may be based on the absolute depth value of the unreliable or incomplete depth value, where the absolute depth value is indicative of an erroneously captured depth value. Identifying the uncertainty region may comprise comparing at least one depth value in the region in the first image with a depth value in a corresponding region of the second image and determining that the difference in compared depth values is below a predetermined threshold.

At least one initial blending factor value in a confidence region may be generated based upon the confident determination and generating the augmented reality image may further comprise combining a corresponding colour value of the first image and a corresponding colour value of the second image in the confidence region using the at least one initial blending factor value. The at least one blending factor value and the at least one initial blending factor value may form part of an alpha matte for combining colour values of the first image and the second image to generate the augmented reality image.

Making the confident determination may be based upon at least one depth value associated with the first image and at least one corresponding depth value associated with the second image. Making the confident determination may be based upon a comparison of at least one depth value associated with a region of the first image with at least one depth value associated with a corresponding region of the second image and wherein the result of the comparison exceeds a predetermined threshold.

Identifying a confidence region further may comprise categorising portions of the confidence region as first confidence regions or second confidence regions, wherein: first confidence regions are confidence regions in which a colour value of the first image is to be rendered in the corresponding region of the augmented reality image; and second confidence regions are confidence regions in which a colour value of the second image is to be rendered in the corresponding region of the augmented reality image. Re-categorising an uncertainty region as either a first confidence region or a second confidence region may be performed prior to determining at least one blending factor value. Re-categorising an uncertainty region as a first confidence region may be based on the uncertainty region being surrounded by a first confidence region. Re-categorising an uncertainty region as a first confidence region may be based upon a determination that confidence regions within a predetermined distance of the uncertainty region are first confidence regions. Re-categorising an uncertainty region as a second confidence region may be based on the uncertainty region being surrounded by a second confidence region. Re-categorising an uncertainty region as a second confidence region based upon a determination that confidence regions within a predetermined distance of the uncertainty region are second confidence regions.

Colour and depth values of at least one of the first and second images from the real scene may be captured using a capture device. Determining the at least one blending factor value may be further based upon the distance between the position of the first colour value and the position of the at least one second colour value. The first colour value and the colour value may be colour values associated with a single image of the first image and the second image. The first colour value and the second colour values may be colour values captured from a real scene.

The uncertainty region may comprise a plurality of sample points and determining the at least one blending factor value may further comprise processing, for each of a plurality of sample points in the uncertainty region, that sample point based upon colour values at a plurality of sample points located in a confidence region within a predetermined distance of that sample point. When processing a sample point in the uncertainty region, a zero weight may be assigned to other sampling points within the predetermined distance of the sampling point that are in an uncertainty region.

Determining the at least one blending factor value for the uncertainty region may comprise applying a cross bilateral filter to each of a plurality of sample points in the uncertainty region based upon: the distance between the position of the first colour value and the position of the at least one second colour value; and the similarity in colour value between the first colour value and the at least one second colour value. The plurality of sample points used in the cross bilateral filter may be identified using a filter kernel and sample points within the filter kernel may be used to determine the at least one blending factor value for the uncertainty region. Comparing the similarity in colour values may comprise comparing the difference in colour for each of a red, a green, and a blue colour component at a sample point with the corresponding colour component at each sample point within the filter kernel that is in the confidence region. The distance between the position of the first colour value and the position of the at least one second colour value may be determined based upon the number of sample points between the first colour value and the at least one second colour value.

Determining at least one blending factor value in the uncertainty region may be based upon a similarity between a colour value in the uncertainty region and at least one corresponding colour value of each of the first image and the second image. Determining at least one blending factor value may be based upon generating at least two error metrics for the uncertainty region, and minimising the error metrics to determine the at least one blending factor value in the uncertainty region. A first error metric may be a gradient metric indicative of gradient changes in blending factor values and a second error metric may be a colour metric indicative of colour similarities between colour values in the uncertainty region and colour values in the confidence region. A plurality of initial blending factor values may be determined and the gradient metric may be determined based upon variations in the plurality of initial blending factor values across an alpha matte.

The colour metric may estimate the probability that a colour value in the uncertainty region forms part of an image of the real scene in front of a virtual object or forms part of the image of the real scene behind a virtual object based on neighbouring colour values. Colour values used in determining the colour metric may be selected by performing a dilation operation on the uncertainty region. The at least two error metrics may be minimised using an iterative method. The colour metric may be formed from fitted Mixture of Gaussian models for each of the part of the real scene in front of a virtual object and the part of the real scene behind a virtual object. The error metrics may be minimised using the Levenberg-Marquardt algorithm to determine the at least one blending factor in the uncertainty region.

An erosion operation may be performed on the confidence region, wherein the erosion operation is configured to re-categorise at least one portion of the confidence region as forming a part of an uncertainty region.

The first image may be a captured image of a real scene and the second image may be an image of a virtual object.

An augmented reality video sequence may be generated from a first video sequence and a further image, the method comprising performing, for a plurality of frames of the video sequence, the above-discussed methods, wherein the first image corresponds to the frame of the first video sequence and the second image corresponds to the further image.

The augmented reality processing system may be embodied in hardware on an integrated circuit. There may be provided a method of manufacturing, at an integrated circuit manufacturing system, an augmented reality processing system. There may be provided an integrated circuit definition dataset that, when processed in an integrated circuit manufacturing system, configures the system to manufacture a augmented reality processing system. There may be provided a non-transitory computer readable storage medium having stored thereon a computer readable description of an integrated circuit that, when processed, causes a layout processing system to generate a circuit layout description used in an integrated circuit manufacturing system to manufacture a augmented reality processing system.

There may be provided an integrated circuit manufacturing system comprising: a non-transitory computer readable storage medium having stored thereon a computer readable integrated circuit description that describes the augmented reality processing system; a layout processing system configured to process the integrated circuit description so as to generate a circuit layout description of an integrated circuit embodying the augmented reality processing system; and an integrated circuit generation system configured to manufacture the augmented reality processing system according to the circuit layout description.

There may be provided computer program code for performing a method as claimed in any preceding claim. There may be provided non-transitory computer readable storage medium having stored thereon computer readable instructions that, when executed at a computer system, cause the computer system to perform the method as claimed in any preceding claim.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 12 illustrates an example filter kernel;

FIG. 13 illustrates an example initial alpha matte based upon the example categorisation map of FIGS. 11(a)-11(b);

FIG. 14 illustrates an example complete alpha matte based upon the initial alpha matte of FIG. 13;

FIG. 15 illustrates an example initial alpha matte for use in an iterative method;

FIG. 16 illustrates neighbourhood values for determining a gradient value;

Figure 1:
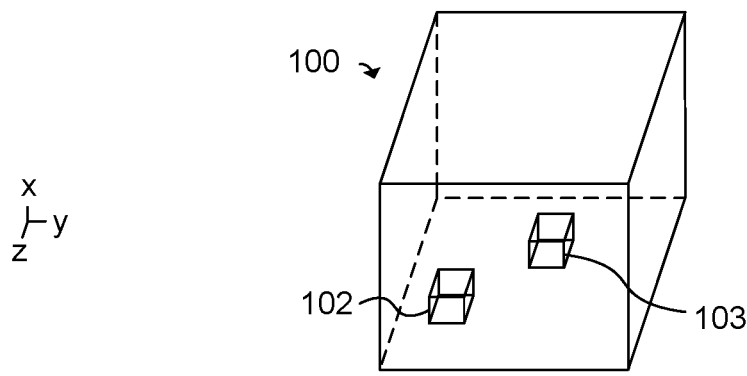
FIG. 1 illustrates an isometric view of a real scene.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 illustrates an isometric view of a real scene 100 that is to be the subject of processing by an augmented reality processing system 2100. The scene 100 is a real three-dimensional space in which real objects 102, 103 may be positioned. The position and orientation of the objects 102, 103 within the scene 100 may be determined in a number of different ways, such as by modelling the scene. For example, it is possible to map the scene 100 with a laser scan to accurately determine the position of the objects with the scene 100. Alternatively, one or more images of the scene 100 may be captured using a capture device (not shown) to obtain depth measurements.

In FIG. 1, a virtual object is not rendered and only a real scene is shown. An augmented reality processing system 2100 may be configured to select a viewpoint of the scene and to capture a first image 500 of the scene with respect to that viewpoint. The augmented reality processing system 2100 may then generate a new image, i.e. an augmented reality image 600, which is a combination of the first image of the real scene and a second image, which may be an image of one or more virtual objects that are to be visually inserted within the real scene.

The second image may be an image of one or more virtual objects taken from the same viewpoint as the first image. As such, the virtual object or the real objects within the scene may be correctly occluded by the other depending on their relative depths with respect to the selected viewpoint.

Figure 2A:
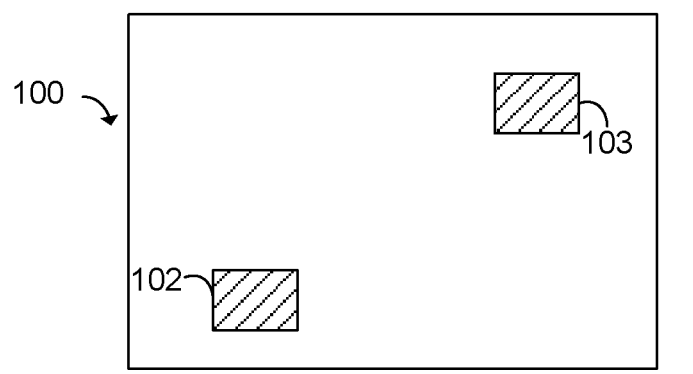
FIG. 2(a) illustrates a plan view of the real scene of FIG. 1 with a capture device.
Figure 2A:
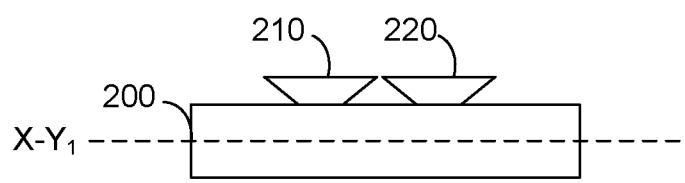

FIG. 2(a) illustrates a plan view of the scene 100 of FIG. 1 in which a first object 102 and a second object 103 is located. A capture device 200 may be positioned relative to the scene 100 so as to capture a first image 500 of the scene 100. Specifically, the capture device 200 may be configured to capture depth values and colour values (such as RGB colour values) of the scene 100 from the viewpoint of the capture device 200. The captured depth values are determined relative to the viewpoint. The position of the capture device 200 may correspond to the viewpoint from which a second image 550 of a virtual object is generated and in which a virtual object is rendered. The second image 550 may therefore be considered to be a virtual image. The depth values of the second image 550 may therefore correspond to those of the first image and are determined with respect to a common viewpoint.

Alternatively, a "virtual" viewpoint may be generated for the first image by interpolating between depth measurements taken from multiple real viewpoints. For example, the capture device 200 may obtain two different depth measurements from two different viewpoints and the augmented reality processing system may interpolate between the two depth measurements to obtain depth measurements for the first image that correspond with the depth measurements for the second image. However, for the purposes of describing the following examples, it will be assumed that the viewpoint from which the augmented reality image 600 is rendered is the same as the position of the capture device 200 from which the colour values and depth values of the scene are captured.

When capturing the depth values of the scene, the capture device 200 determines the distance of the scene from the capture device 200 at a plurality of different sampling points across the scene to create an array of depth values. For example, the capture device 200 may comprise a first sensor 210 and a second sensor 220. The first sensor 210 is configured to capture a first image 500 of the scene 100 comprising a plurality of first colour values. The captured colour values in the first image 500 may be in the form of RGB colour values for a plurality of pixels which combine to represent the scene from the viewpoint of the capture device 200, for example in an array of pixels each having a red, green, and blue colour component value.

The second sensor 220 is configured to capture depth values from the scene 100. For example, the second sensor 220 may be an Infra-Red (IR) sensor configured to detect the presence of IR signals. The capture device 200 may also include an IR transmitter (not shown) configured to transmit IR signals which are then captured by the second sensor 220. By measuring the received IR signals, it is possible to make a determination regarding depth information at each of a plurality of sampling points across the scene 100.

The sampling points at which a depth value is captured may correspond with the points at which colour information is captured. Put another way, portions of the scene at which depth measurements are captured may have a one-to-one correspondence with pixels of an image of the scene captured by the capture device 200. The depth information may be captured such that it directly corresponds in position to the colour information.

For example, depth information may be obtained for an area of the scene with the same resolution as colour information by the capture device. In some arrangements, depth information may be obtained at a lower resolution than the colour values and thus some degree of interpolation may be required to ensure a correspondence in values. Similarly, the depth information may be at a higher resolution than the colour information. It will be assumed for the purposes of describing the following examples that the resolution of the captured depth values and the captured colour values are the same.

The IR signals transmitted by the capture device 200 may be transmitted in a grid and time-of-flight information may be used to determine the depth value at each sampling point captured by second sensor 220. For example, the second sensor 220 may be configured to detect the phase of the IR signal. In this way, it is the surface of the scene which is closest to the capture device at a particular sampling point which is used to determine the depth value at that sampling point. For example, the face of object 102 that is closest to the capture 200 defines the depth value for sampling points that fall upon that face.

As can be seen from the plan view of scene 100 in FIG. 2(a), the first object 102 is located closer to the capture device 200 than the second object 103 in the z dimension. Accordingly, the depth measurements detected by second sensor 220 at sampling points that align with the first object 102 will be less than corresponding depth measurements taken at sampling points aligned with the second object 103, i.e. the first object is closer than the second object. Similarly, for portions of the scene 100 captured at sampling points where neither the first object 102 nor the second object 103 are present, the measured depth will be determined by the distance of the background of the scene 100 from the capture device 200. In the example of FIG. 2(a), the background is determined by the rear plane of the scene 100 furthest from the capture device 200.

Figure 2B:
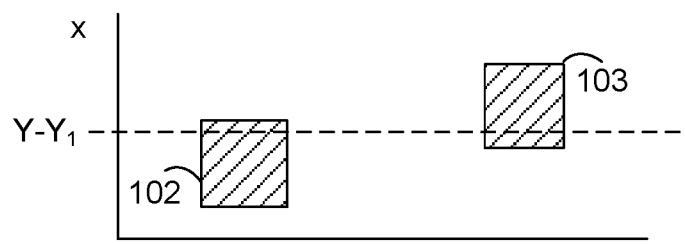
FIG. 2(b) illustrates a view of the real scene of FIG. 2(a) from the viewpoint of plane $X-Y_1$.
Figure 2C:
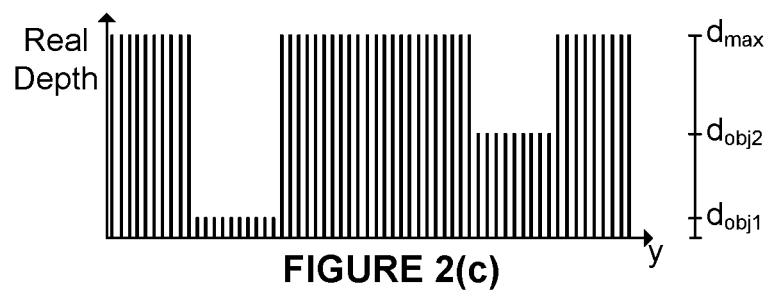
FIG. 2(c) illustrates depth measurements obtained from the capture device through line $Y-Y_1$ of FIG. 2(b)

FIG. 2(b) illustrates the relative positions of the first 102 and second 103 objects as seen from a viewpoint of the scene in an x-y plane defined by X-$Y_1$ at capture device 200. An example set of depth values are demonstrated in FIG. 2(c) along dimension y. The captured depth values shown in FIG. 2(c) reflect the depth values captured along line Y-$Y_1$ as shown in FIG. 2(b). FIG. 2(c) illustrates a number of sampling points at which depth values were captured. As shown in FIG. 2(c), three different values are identified by the capture device across these sampling points. A number of lines of depth values across plane X-$Y_1$ may be obtained to generate an array of depth values of the scene.

It can be seen that the largest of the three depth values captured by the capture device 200 along line Y-$Y_1$ are captured where neither the first object 102 nor the second object 103 is located, for example in the area between the two objects at depth $d_{max}$. Accordingly, the captured depth measurement is based upon the measured depth of the background of the scene 100. Another measured depth is $d_{obj1}$ which corresponds with the depth values determined at sampling points which fall on the surface of first object 102, i.e. the portion of line Y-$Y_1$ that intersects first object 102. Similarly, depth $d_{obj2}$ corresponds with sampling points of the depth value that fall on second object 103. As illustrated in FIG. 2(c), the captured depth values are discrete values that represent the depth value determined at a sampling point. However, the depth values may correspond with regions of the image rather than individual points.

It will be noted that, in the example of FIG. 2(a) to FIG. 2(c), occlusion of the two real objects 102, 103 does not occur with respect to one another. This is because the two objects do not overlap one another along dimension y. The example of FIG. 2(a) to (c) therefore illustrates an arrangement in which real depth values are captured.

Another example of a different scene 110 is provided in relation to FIG. 3 in which real objects are occluded with respect to one another.

Figure 3A:
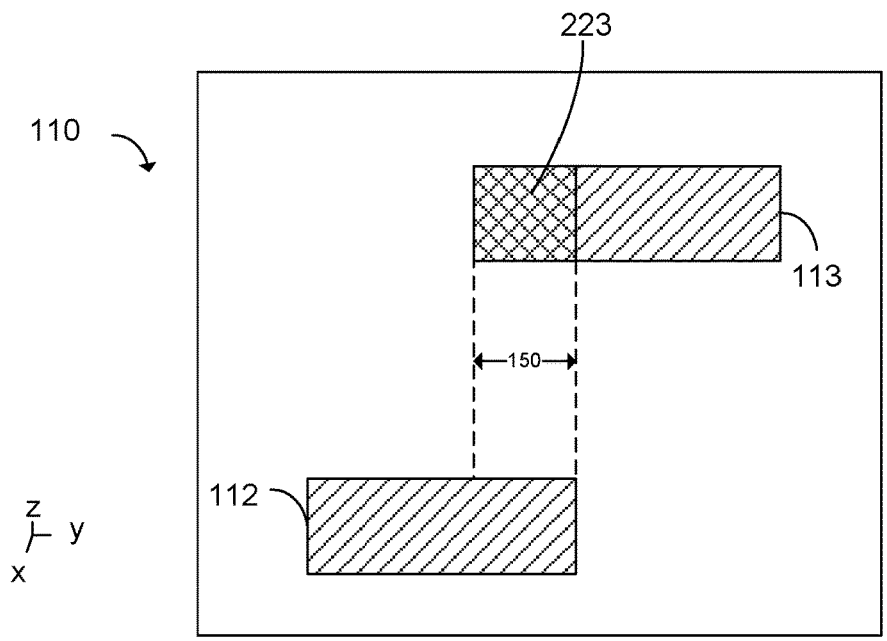
FIG. 3(a) illustrates a plan view of second real scene.
Figure 3A:
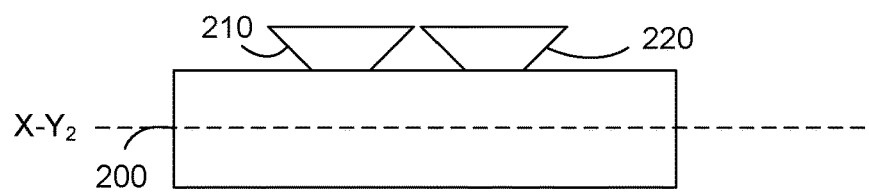
Figure 3B:
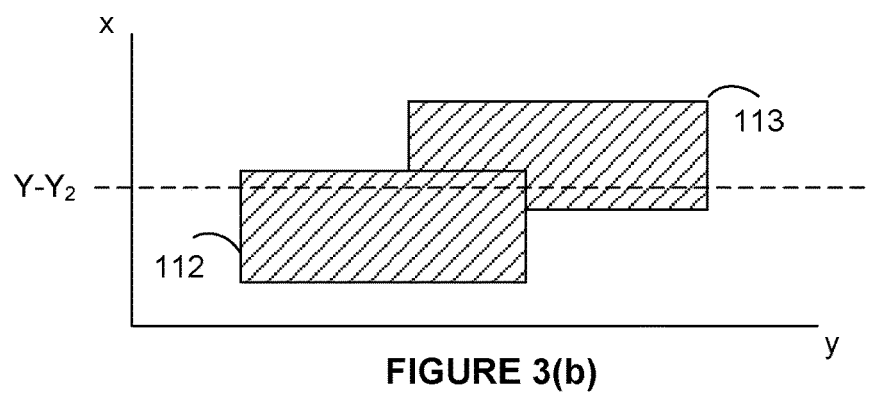
FIG. 3(b) illustrates the real scene of FIG. 3(a) from the viewpoint of plane $X-Y_2$.
Figure 3C:
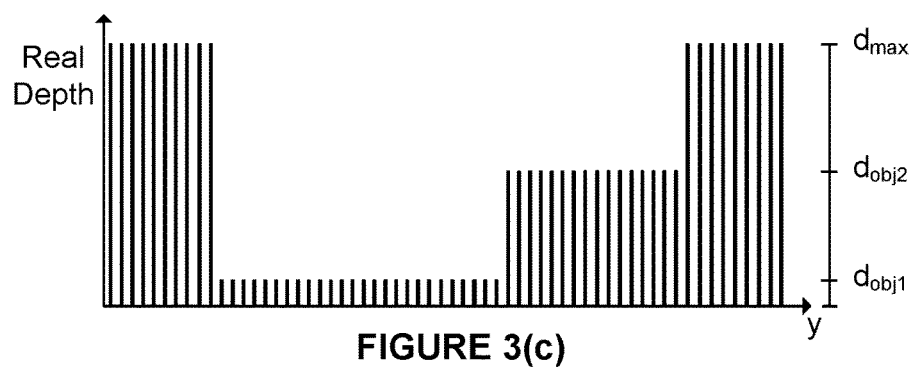
FIG. 3(c) illustrates depth measurements obtained from the capture device through line $Y-Y_2$ of FIG. 3(b)

In FIGS. 3(a) to 3(c), third 112 and fourth 113 objects are located within a different three-dimensional scene 110. Objects 112, 113 are located within scene 110 such that they overlap one another in dimension y, when considered from the viewpoint of the capture device 200 at plane X-$Y_2$. Since third object 112 is closer to the capture device 200 with respect to dimension z than fourth object 113, a portion of fourth object 113 indicated by area 223 is occluded from view in an image of the scene 110 taken from the viewpoint of capture device 200.

For example, third object 112 and fourth object 113 overlap in the y dimension at a portion of the respective objects across an area indicated by reference number 150. Accordingly, depth values obtained by the capture device 200 at sampling points in region 150 are determined based upon the distance of third object 112 from the capture device rather than the distance of fourth object 113, since the third object 112 is closer to the viewpoint at the capture device 200 than the fourth object 113, with respect to dimension z. Similarly, the colour values captured by capture device 200 over region 150 will be the captured colour of the third object 112 rather than the fourth object 113.

In this way, a portion 223 of fourth object 113 that is located within region 150 is occluded from the viewpoint at the capture device 200 by the portion of third object 112 that also falls within region 150. FIGS. 3(b) and 3(c) illustrate depth measurements for scene 110. It will be appreciated that real objects may be occluded in traditional image capture systems by other objects.

In more detail, FIG. 3(b) illustrates the viewpoint of the capture device 200 with respect to real objects 112 and 113 through plane X-$Y_2$. The resultant depth value measurements across line Y-$Y_2$ are shown in FIG. 3(c). As can be seen from FIG. 3(c), the depth values for portions of line Y-$Y_2$ that are intersected by either the third object 112 or both the third 112 and fourth object 113 take the depth values of the third object 112 ($d_{obj1}$), whilst portions of line Y-$Y_2$ that are intersected only by the fourth object 113 take the depth values of the fourth object 113 ($d_{obj2}$). As with the arrangement of FIGS. 2(a) to 2(c), the portions of line Y-$Y_2$ not intersected by either the third object or the fourth object have a depth value corresponding to the background of the scene ($d_{max}$).

Accordingly, in traditional image capture systems, only colour information relating to real objects in a scene that are not occluded by other real objects is captured by the image sensor. In augmented reality processing systems, it is desirable to re-create this behaviour for arrangements in which virtual objects are to be rendered in a manner that allows the virtual objects to appear to behave in the same manner as a real object to provide added realism to the augmented reality image.

Accordingly, it is desirable for virtual objects to be accurately rendered to generate an augmented reality image of a scene. To generate an augmented reality image, it is determined whether or not portions of a virtual object in an image should be occluded based upon where in an image of a real scene a virtual object is to be rendered. In this way, the virtual object is effectively processed in a similar manner as described above by determining which of the real elements and the virtual elements (e.g. the real and virtual objects) have the least depth values. However, as discussed above, errors in determining the depth values may affect the perceived realism of the augmented reality image.

Returning to the scene 100 illustrated in FIGS. 2(a) to 2(c), a first object 102 and a second object 103 are positioned within the scene 100. Scene 100 is to be used to generate an augmented reality image 600 in which a portion of a second image 550 of a virtual object 104 is to be combined with an image of the scene 100. In the following example, an image 600 of the scene 100 from a particular viewpoint is to be rendered to show the virtual object 104 within the scene 100.

To generate the augmented reality image 600, the position and depth values of a virtual object 104 with respect to the scene are determined and the virtual object 104 is rendered with respect to a selected viewpoint of the scene 100.

A plurality of depth values are determined for the virtual object 104 at a plurality of sampling points, where each depth value represents a depth of a portion of the virtual object 104 with respect to the viewpoint. A correspondence between the position of a sampling point of the depth of the virtual object 104 and the position of a sampling point of the depth of the real scene 100 may be formed to allow a comparison of real and virtual depth values. If there is no direct correspondence, it may be necessary to interpolate between depth sampling points in order to compare the virtual and real depths.

For the sake of simplicity in describing the following examples, it is assumed that there is a direct correspondence between the sampling point of each real colour value, each real depth value, each virtual colour value, and each virtual depth value. For example, each virtual depth value of the virtual object 104 is directly associated with a pixel of an image of the real object 104 from the defined viewpoint. In turn, each captured depth value of the real scene 100 from the viewpoint is also associated with a depth value for the real scene 100. Similarly, colour values (e.g. RGB colour values) of an image of the virtual object may be associated in position with colour values of an image of the virtual object. Accordingly, there may be a direct correspondence in position between pixels of an image of the scene and pixels of the rendered virtual object.

A depth map comprising a plurality of depth values for different portions of the image 550 of the virtual object 104 is determined. By comparing the captured depth values in the depth map for the virtual object 104 with depth values at corresponding positions of the real scene 100 it is possible to determine which captured colour value is to be rendered. For example, where the depth value of the image of the virtual object is less (the virtual object is closer) than the depth value of the image of the real scene, the colour value at that position of the virtual object is rendered. Similarly, where the depth value of the image of the real scene is less (the real scene is closer), the colour value at that position of the image of the real scene is rendered.

Figure 4A:
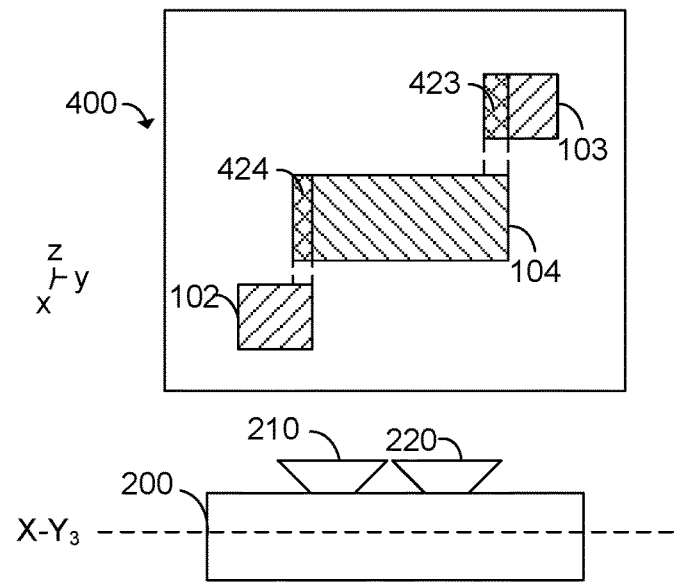
FIG. 4(a) illustrates a plan view of the real scene of FIG. 1 with an occluded virtual object positioned therein.
Figure 4B:
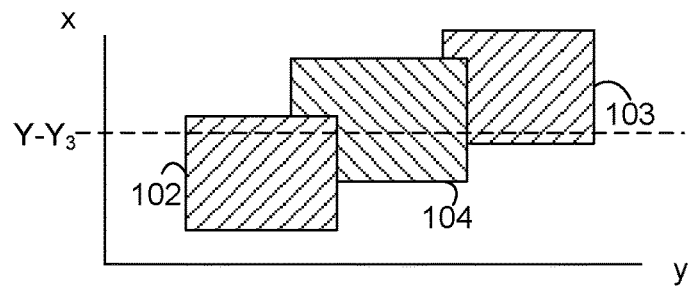
FIG. 4(b) illustrates a view of the real scene of FIG. 4(a) from the viewpoint of plane $X-Y_3$.
Figure 4C:
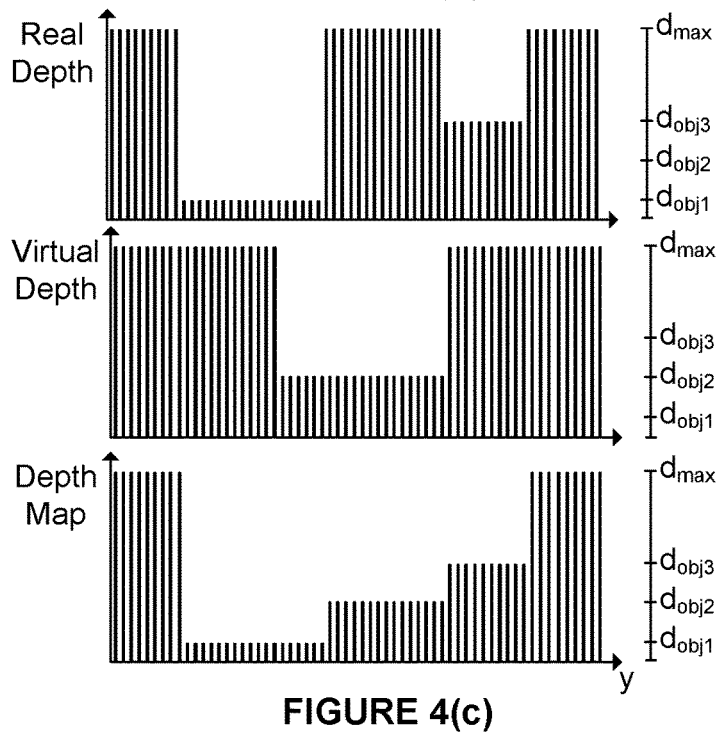
FIG. 4(c) illustrates depth measurements obtained from the capture device through line $Y-Y_3$ of FIG. 4(b)

FIGS. 4(a) to (c) illustrate an arrangement in which the depth values of an image of the virtual object 104 are such that the virtual object 104 is effectively located between two real objects 102, 103 in the real scene 400, as illustrated in the example plan view of the scene 400. As such, based on the comparison of depth values, the virtual object 104 will be partially occluded by real object 102 and, in turn, real object 103 will be partially occluded by virtual object 104.

In FIG. 4(c), real depth values and virtual depth values may be determined with respect to line X-Y₃. A depth map may be in the form of an array of depth values for the scene can be generated based upon the real and virtual depth values. The depth map is generated by comparing at each sample point the captured depth value with the corresponding virtual depth value. With respect to the position of the capture device 200, the depth values of the virtual object 104 in dimension z are such that the virtual object 104 would occlude a portion of object 103 indicated by region 423. Whilst the virtual object 104 and second object 103 overlap, the virtual object 104 has a depth value indicating that the virtual object 104 has a lower depth value (i.e. it is closer to the capture device) than the second object 103. In some examples, it is not necessary to generate a complete depth map from the real and virtual depth values. Instead, the values could simply be compared and the determination of the comparison used for further processing on a sample by sample basis without initially generating a complete depth map. In this way, the generation of a complete depth map may be replaced with the determination at each sample point with a determination as to which of the first and second image is closer to the viewpoint without storing the results as a separate array.

Accordingly, the portion of object 103, indicated by area 423, which overlaps along dimension y the virtual object 104 is occluded from view in the augmented reality image 600 and is thus not rendered in the augmented reality image 600. As such, since no other object or element in scene 400 is located between the capture device 200 and the virtual object 104, the corresponding portion of virtual object 104 that falls within that area would be rendered in the resultant augmented reality scene 600 instead of the real object 103. Put another way, the colour value at a corresponding position of the second image 550 of the virtual object would be used in the augmented reality image 600.

Similarly, real object 102 within scene 400 overlaps in the y dimension with virtual object 104. Since real object 102 is closer (i.e. has a smaller depth value) to the capture device 200 in direction z than the determined distance values of the rendered virtual object, a portion of object 104 is occluded from view by the capture device 200. Specifically, area 424 indicated in FIG. 4(a) is occluded from view by the capture device 200.

As such, the finally rendered augmented reality image 600 would be formed of portions of a first image 500 of the real scene 400 and portions of the second image 550 of the virtual object 104. For example, for a row of pixels of the augmented reality image 600 that falls along line Y-Y₃, pixels that have a correspondence with depth values $d_{obj2}$ are rendered using the corresponding colour values of the second image 550 of the virtual object 104 since the virtual object 104 has a lower depth value (i.e. is closer) than the corresponding depth value of the image 500 of the real scene 400. Similarly, for pixels that correspond with depth values $d_{obj1}$, $d_{obj3}$, and $d_{max}$, the colour values associated with pixels of the first image 500 of the real scene 400 are used since the corresponding depth values of the real scene 400 are less (i.e. they are closer) than the depth values of the second image 550 of the virtual object 104. Alternatively, it may that the virtual object 104 is not present at the location of some pixels (e.g. the pixels located at $d_{max}$ locations) and thus the corresponding colour values of the real scene are used.

Figure 5A:
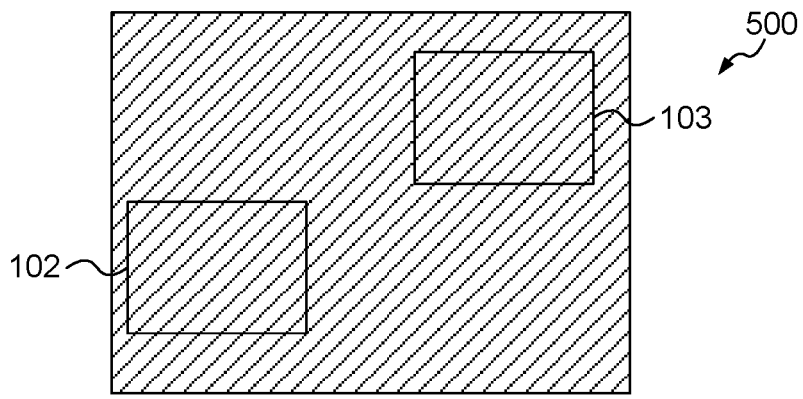
FIG. 5(a) illustrates a representation of a first image.
Figure 5B:
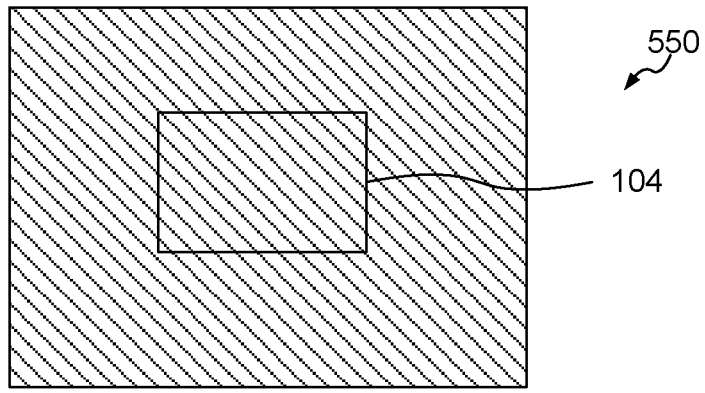
FIG. 5(b) illustrates a representation of a second image.
Figure 6:
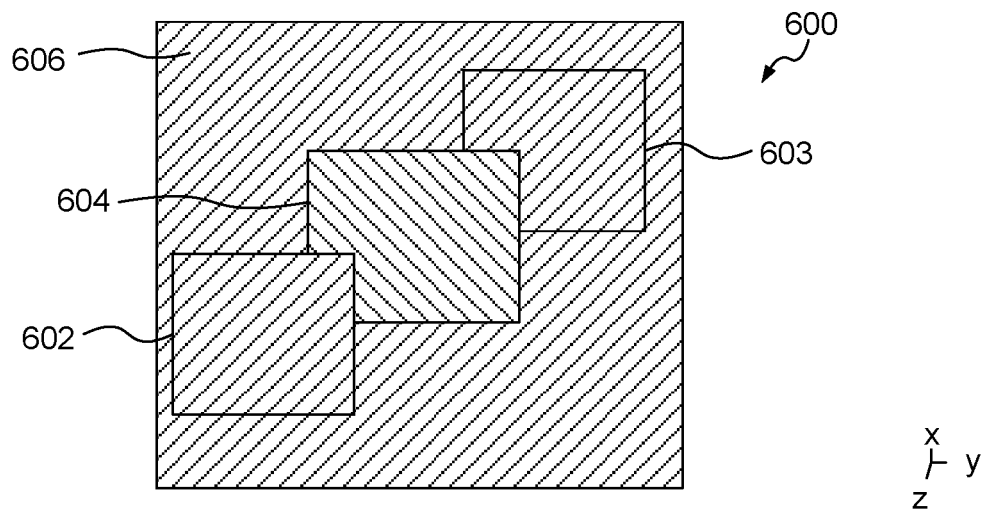
FIG. 6 illustrates a representation of a generated augmented reality image.

A representation of the first 500 and second 550 images is illustrated in FIGS. 5(a) and 5(b). An augmented reality image 600 based upon the scene of FIG. 4 and the images of FIGS. 5(a) and 5(b) is illustrated in FIG. 6. As can be seen portions of the augmented reality image 600 are rendered based upon the colour values of the first image 500 of the real scene, including a first portion 602 corresponding to a portion of the first image 500 corresponding to the real object 102, a second portion 603 corresponding to real object 103, and a background portion 606 corresponding to the background of scene 100. Similarly, portion 604 of image 600 is rendered using the colour values of the virtual object 104 from the second image 550.

As can be seen from FIG. 6, the virtual object 104 in the second image 550 is partially occluded by the surface of object 102, such that the overlapping area 424 is rendered using the colour values of object 102 from the first image 500 rather than the colour values for the corresponding region of virtual object 104 from the second image 550. Similarly, virtual object 104 overlaps the object 103 at area 423. Since the virtual object 104 is closer to the capture device 200, the colour values of the virtual object 104 from the second image 550 are used when rendering the resultant augmented reality image 600 instead of the colour values of object 103 from the first image 500.

In this way, by comparing the depth values of the virtual object from a viewpoint with corresponding depth values of an image of the real scene, the occlusion of the virtual object within an augmented reality image 600 is performed and an accurate augmented reality image 600 may be generated.

In practice, erroneous determinations as to which image should be selected for rendering may occur. These errors may occur because the determination of the depth values for a first image 500 of the real scene may not be accurately obtained by the capture device 200.

Figure 7A:
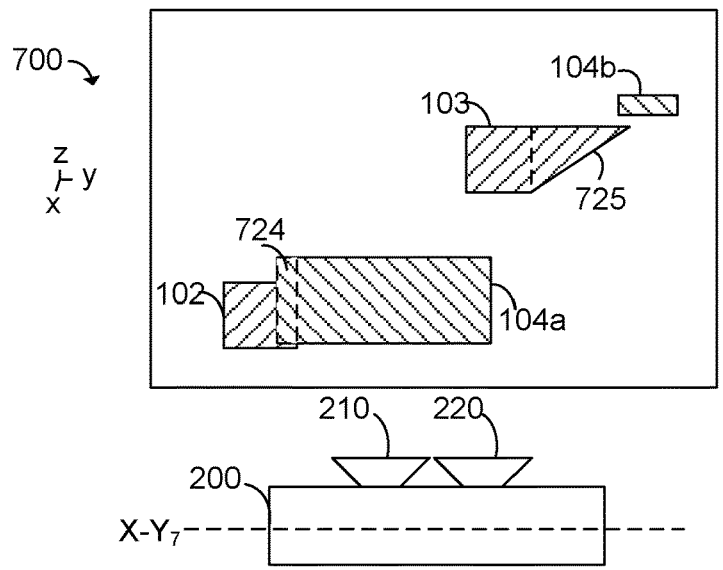
FIG. 7(a) illustrates a plan view of a third real scene.
Figure 7B:
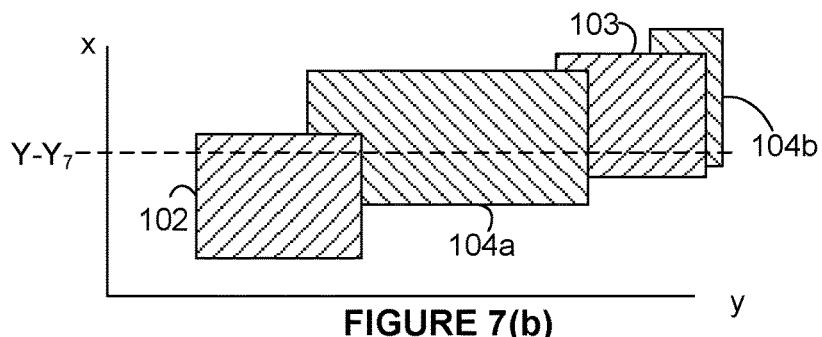
FIG. 7(b) illustrates a view of the real scene of FIG. 4(a) from the viewpoint of plane $X-Y_7$.
Figure 7C:
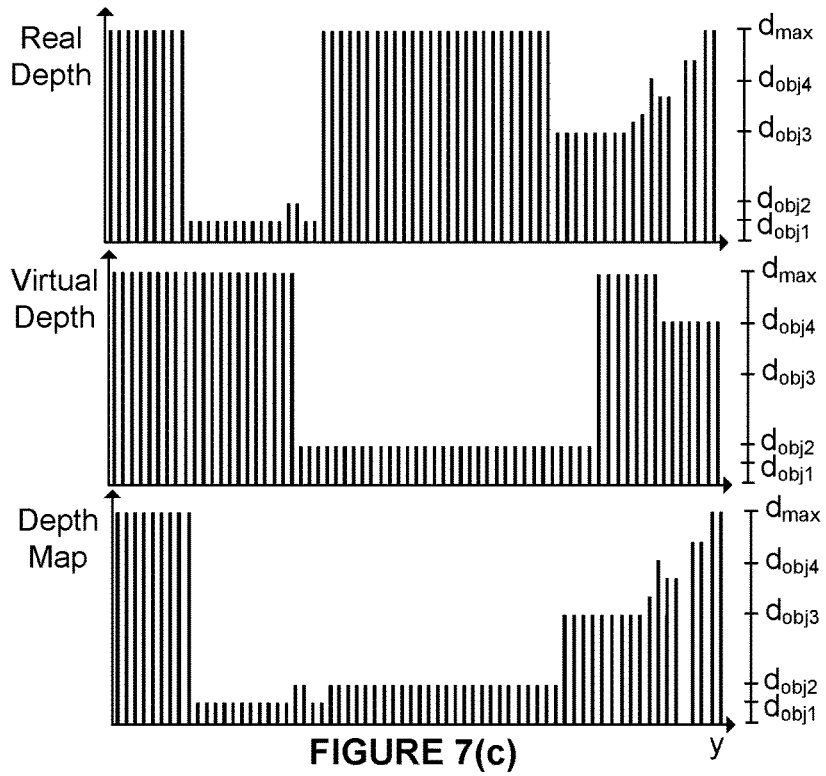
FIG. 7(c) illustrates depth measurements obtained from the capture device through line $Y-Y_7$ of FIG. 7(b)

FIGS. 7(a) to (c) and 8 illustrate an example implementation where errors in the captured depth values can lead to spurious artefacts in the resultant rendered augmented reality image. Scene 700 of FIGS. 7(a) to (c) illustrates an arrangement in which the determined depth values for a virtual object 104a and a real object 102 within scene 600 are similar, with respect to the capture device 200. As such, any significant deviation in the depth values determined by the capture device 200 may result in the comparison of the depth values producing a different, erroneous outcome.

Scene 700 also illustrates a real object 103 and virtual object 104b which overlap in dimension y. A first image may be captured of the real scene 700 to include the real objects 102 and 103 and a second image may be rendered that includes the virtual objects 104a and 104b. FIGS. 7(b) and 7(c) correspond with FIGS. 4(b) and 4(c) but for scene 700. Depth $d_{obj1}$ corresponds with the depth of object 102, depth $d_{obj2}$ corresponds with the depth of object 104a, depth $d_{obj3}$ corresponds with the depth of object 103, depth $d_{obj4}$ corresponds with the depth of object 104b, and depth $d_{max}$ corresponds with the depth of the background of scene 400.

If the amount of variation in the captured depth value of the real scene 700 exceeds the difference in depth values, at a particular position, between real and virtual objects, then erroneous rendering the resultant augmented reality image 800 may occur. For example, where the virtual object 104a and the real object 102 have similar depth values, the augmented reality processing system may erroneously determine that the colour values of the real object 102 should, at particular pixels, be rendered instead of the colour values of the virtual object 104a. This is illustrated with respect to area 724 in which objects 102 and 104a overlap in dimension y and may result in erroneous rendering. The result of such an erroneous determination is that the overlapping areas may appear disjointed or noisy, with visual artefacts of the real scene being incorrectly rendered within the rendered virtual object in the resultant rendered augmented reality image 700.

For example, FIG. 7(c) illustrates spurious depth values captured from real object 102 at depth $d_{obj1}$ that correspond with region 724. Similarly, spurious depth values can be seen that correspond with region 725. These spurious values may also arise due to variations in captured depth values of object 103 resulting in object 104b being incorrectly rendered in place of the object 103. In addition, FIG. 7(c) illustrates that some depth values are missing. This is because the surface of real object 103 is not perpendicular with the viewpoint and thus reflections may result in depth values not being captured.

Figure 8:
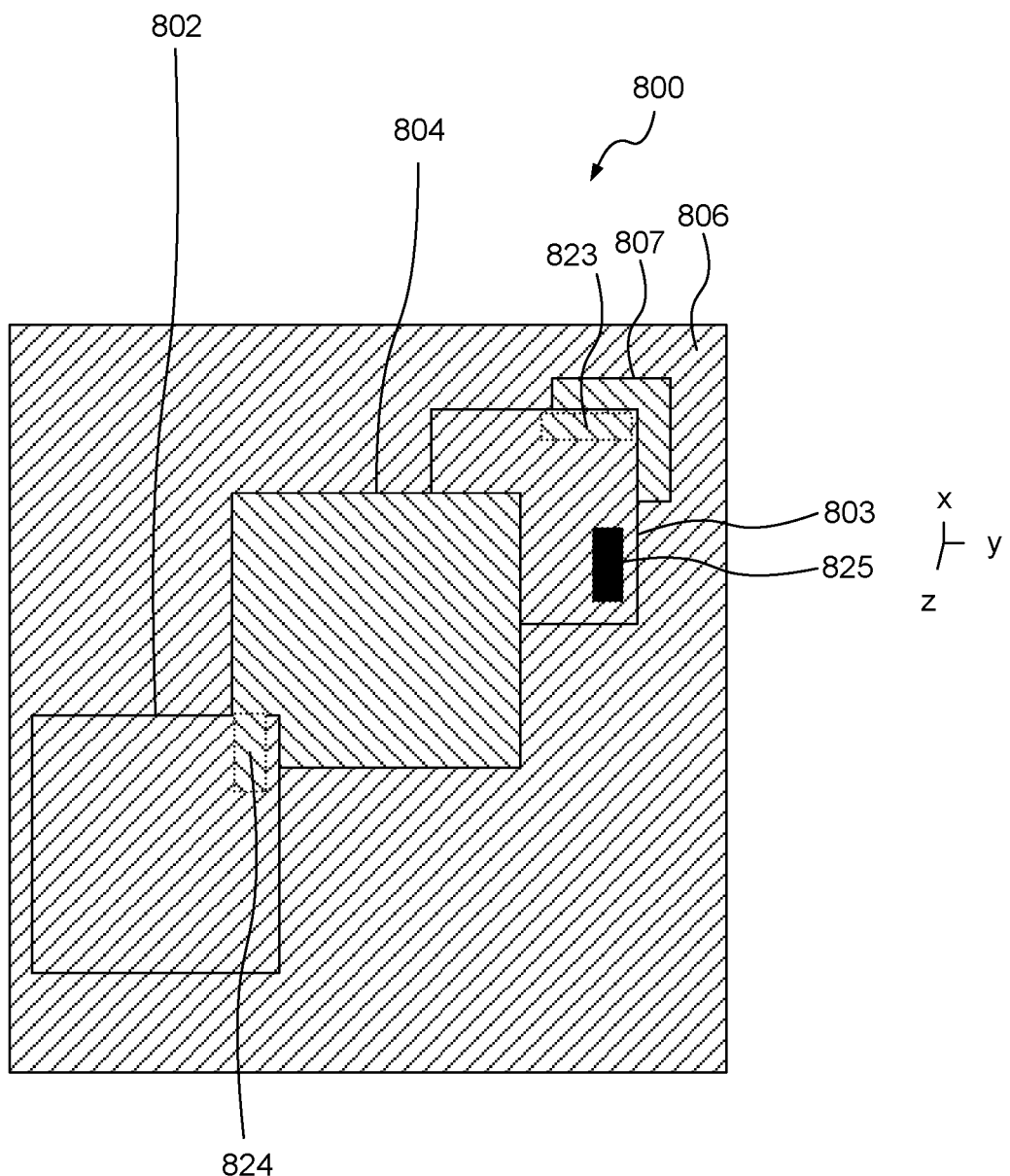
FIG. 8 illustrates a representation of a generated augmented reality image based upon the scene of FIG. 7.

FIG. 8 illustrates the resultant rendered augmented reality image 800 and corresponds to image 600 except that image 800 is generated based upon the scene illustrated in FIG. 7 rather than the scene illustrated in relation to FIG. 4. FIG. 8 illustrates an arrangement in which unreliable or incomplete depth values captured from the scene of FIG. 7 may result in artefacts in the final augmented reality image 800. As such, regions 802, 803, 804 and 806 in FIG. 8 respectively correspond with regions 602, 603, 604, and 606 in FIG. 6. In addition, image 800 comprises a region 807 in which virtual object 104b is rendered. Reference numeral 804 indicates the region of the augmented reality image 800 in which the virtual object 104a is rendered.

However, as shown in rendered image 800, portions of the image have been incorrectly rendered, such as regions 823 and 824, or have not been rendered at all, such as the shaded region 825. For example, region 824 has incorrectly rendered using the colour values of virtual object 104a rather than the correct colour values of real object 102 due to errors in the depth measurements of the first image of the real scene 700. Similarly, region 823 of the rendered scene has been incorrectly rendered using the colour values of object 104b rather than the corresponding colour values of the rendered virtual object 103. As such, regions 823 and 824 appear as spurious artefacts in the resultant image.

Similarly, due to the orientation or the specular properties of the real object 103 in the real scene 700, it may not be possible for depth values to be obtained for portions of the scene and thus an error occurs such that neither colour is rendered, such as region 825. As such, the depth values captured of the real scene may be incomplete. In the example of FIG. 8, the region of object 103 indicated by reference numeral 825 has an orientation and surface properties with respect to the capture device 200 such that the resultant depth measurements for that region are unobtainable.

Since depth values captured from a real scene may include errors, any subsequent comparison of depth values in that region may result in erroneous rendering. This may occur across the entire surface of the region 825 of rendered object 103 or instead may be occur on a pixel-by-pixel basis, such that the resultant erroneous rendering is either large-scale or sporadic, as set out above in respect of issues caused by the degree of noise in the depth measurements for the real scene.

To overcome these issues, there is a need for the augmented reality processing system to reduce the impact of an erroneous determination as to which of a plurality of images to render in a region of an image. Where real objects and virtual objects overlap in depth in a scene, and a portion of one object is occluded by the other, the boundaries between the two objects can appear visually disturbing to the determination of depth values. There is therefore also a need to smooth the transition from a real object to a virtual object (or vice versa) in a scene to avoid disturbing transitions in colour from one object to the other. There is also a need to handle partial occlusions, in which an alpha matte for blending images is to be determined.

An improved approach for generating an augmented reality image will now be described with reference to the following figures.

Augmented Reality Image Generation

An example method will now be described in relation to scene 400, as illustrated in FIG. 4. As shown in FIG. 4, a real scene 400 comprises real objects 102 and 103 and virtual object 104 is to be rendered within the scene in such a way as to correctly occlude the virtual and real objects within the scene. An example method of generating an augmented reality image is illustrated in further detail in FIG. 9.

Obtaining First and Second Images

The method 900 begins at step 910 at which first 500 and second 550 images are captured. In general, either image or both images may be virtual images or partially virtual images provided that at least a portion of one image is an image of a real scene and another portion of either image contains virtual information. Put another way, portions of either or both image may comprise virtually generated content. The method 900 comprises capturing depth and colour values of the scene which form at least part of at least one of the first and second images and then determining colour and depth values for the remaining virtual portions of the first and second images.

For example, an RGB colour map and a depth map may be determined for the first image 500 and the second image 550 based on a combination of virtual depth and colour information and real colour and depth information. For the purposes of the following example, it is assumed that an RGBD camera has been used and that the resolution of the depth map matches the resolution of the RGB colour map for the scene such that there is a direct correspondence between a pixel in the depth map and a corresponding pixel in the RGB colour map. In this way, it is possible to perform direct assessment of each pixel in the two images. Furthermore, for the following example, the first image 500 is an image of the real scene 400 and the second image 550 is an image of the virtual object 104, both taken from an identical viewpoint positioned at the capture device 200.

Having completed step 910, the method proceeds to a step of categorisation in which the confidence and uncertainty regions are identified.

Identify a Confidence Region

At step 920, a confidence region is identified, wherein the confidence region is a region of the scene in which a confident determination as to which of the first 500 and second 550 image to render in that region of the augmented reality image 600 can be made. For example, the first and second images may be compared at corresponding regions and, where the difference in depth values between images exceeds a threshold, the region may be marked as a confidence region since there can be a degree of confidence that the result of the comparison is correct.

The identification of a confidence region may include identifying one or more regions of the scene in which the first and second images do not comprise captured depth values of a real scene. In such regions there is certainty as to which image should be rendered (aside from exactly equal depth values) as it can be assumed that there is no capture error in the depth of virtual images. One approach to identifying such regions as confidence regions would be to track which of the depth and colour values have been obtained from a real scene and to identify regions of the scene in which only virtual depth values are present. These regions may automatically be identified as confidence regions. In some arrangements, it may be that regions in which only virtual depth values are present are deemed uncertainty regions, as will be described later. Alternatively, all regions of the first and second images may be individually processed to identify confidence regions.

As well as identifying confidence regions by identifying regions of the first and second images in which only real data is present, it is also possible to identify confidence regions in which at least one of the first and second image has a depth value captured from a real scene. For example, it could be determined that a region is a confidence region based upon a difference in the depth values of the first and second images being sufficiently large that any noise in the captured depth values would not affect the result of a comparison of the depth values of the first 500 and second 550 images.

Specifically, for a depth value at position x, y in the first image, $D_1(x,y)$, and a corresponding depth value at position x, y in the second image, $D_2(x,y)$, it is possible to determine whether or not the difference in value exceeds a threshold. A confidence region may be identified if the magnitude of the difference in depth values exceeds a predetermined threshold. In practice, this predetermined threshold may be manually selected when configuring the system. For example, setting the predetermined threshold to be greater than a maximum noise value may reduce the amount of noise in the final image but would do so at the cost of reducing the confidence region (and therefore increasing the size of the uncertainty region, as will be described later). As such, the amount of processing required by the system may be increased since the amount of an image that needs processing as described herein may be increased. Accordingly, there may be a trade-off between an acceptable level of noise that is accounted for in the predetermined threshold and the amount of processing that is required on the regions that are not identified as confidence regions.

Therefore, the predetermined threshold may be configured to be greater than a background noise level of the depth values captured from the real scene and lower than a maximum noise value. In this way, regions in which an erroneous depth value may result in an erroneous determination as to which image of the first image and second image to render in that region are reduced. Alternatively, if both images comprise real depth values of a scene, those regions in which the real depth values fall at the same point may have a different threshold, which may be twice as large to allow for cumulative addition of the error in each captured depth value.

Where the difference in depth values exceeds a predetermined threshold, i.e. the virtual object is not close in dimension y of FIG. 4 to a real object in the real scene, the determination that the colour values of one of the first 500 and second 550 images is to be rendered in place of the other may be accepted or relied upon with a degree of confidence and thus the region may be identified as a confidence region. In the present example, the difference in depth between the virtual object 104 and objects in the real scene 400 may be such that any noise in the obtained depth value at that pixel would not influence the determination as to which image to render. This is illustrated by the following inequality, where θ is the predetermined threshold:

$$\theta < |D_1(x,y) - D_2(x,y)|$$

However, at a particular pixel position x, y, if the difference between the two depth values is less than the predetermined threshold, then it may be determined that the is pixel is a candidate for an erroneously rendered pixel, since the real scene and virtual object have similar depth values. This is illustrated by the following inequality:

$$\theta \geq |D_1(x,y) - D_2(x,y)|$$

In the event that this inequality is met, the position x, y may be regarded as an uncertainty region, which will be described in more detail in relation to step 930. It will be appreciated that the situation where $\theta = |D_1(x,y) - D_2(x,y)|$ can be handled in different manners. For example, in this situation the position x, y can be regarded as a confidence region or an uncertainty region, depending upon the specific implementation.

Having identified, for each region of the augmented reality image, whether that region is a confidence region it is possible to further categorise the regions so that each region of the augmented reality image falls within one of more than two different categories. In particular, portions of an identified confidence region may be sub-categorised into one of three sub-categories, namely first, second, and third confidence regions, as will be described in more detail below.

In this example, a categorisation map is generated which indicates into which category each region of the scene is categorised. The example categorisation map includes, for a corresponding pair of depth values, a value indicating the category at that pair of depth values based upon a comparison of the corresponding depth values of the first 500 and second 550 images. An example categorisation map generated based upon the scene of FIG. 4 is illustrated in FIG. 10.

Figure 10:
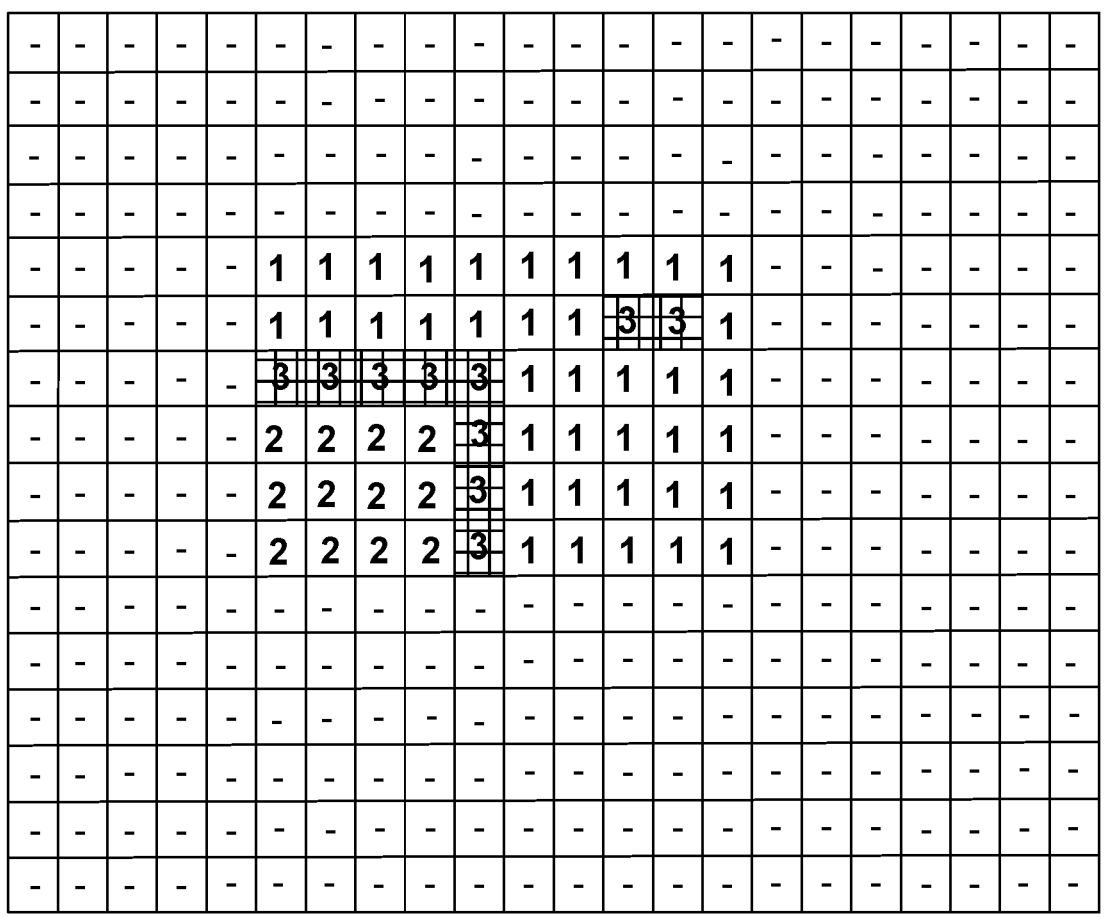
FIG. 10 illustrates an example categorisation map.

In the current example, four different categories are defined and will be illustrated in relation to FIG. 10. Regions of the augmented reality image may be categorised according to one of the four categories described below. Three of the four categories are the three sub-categories for a confidence region, namely (i) an "in-front" region denoted "1", (ii) a "behind" region denoted "2", and (iii) "off object" region denoted "-". The fourth category is the uncertainty region denoted "3". In the present example, the pixel resolution of the first image 500 and the second 550 image is given to be the same. For the purposes of the present example, it can be assumed that the depth values of the background of the image of the virtual object are given a value such that they are not taken into consideration for rendering purposes.

Generally, a confidence region can be categorised as a first confidence region if the depth value in the confidence region of the first image (e.g. of the real scene) is less than a corresponding depth value in a second image (e.g. of a virtual object) such that the first image is closer than a second image. In the present example, where the first image is an image of a scene and the second image is an image of a virtual object, the first confidence region is a region in which the real scene is to be rendered, for example region 602 of FIG. 6. In the present example, the first confidence region may be considered to be a "behind" region since the virtual object is deemed to be positioned behind an object in the real scene and is thus located behind the real scene. In the categorisation map illustrated in FIG. 10, the behind regions are indicated by numeral 2.

A confidence region may also be sub-categorised as a second confidence region if the depth value in the confidence region of the first image 500 is greater than a corresponding depth value in a second image 550. In the present example, where the first image 550 is an image of real scene 400 and the second image is an image of a virtual object 104, the second confidence region is a region in which the colour value of the virtual object is used for rendering, for example region 604 in FIG. 6. In the present example, the second confidence region may be considered to be an "in-front" region since the virtual object is deemed to be positioned in front of the real scene. Put another way, it is colour values of the second image of the virtual object 104 that should be rendered in these pixels in the augmented reality image 600. "In-front" regions are illustrated in the categorisation map of FIG. 10 by numeral 1.

To make a determination as to whether a pixel of the scene should be categorised in the first confidence region or the second confidence region, the depth value of the first image and the depth value of the second image at that pixel are compared.

In one example, C(x,y) is set to 2 if $D_1(x,y) > D_2(x,y)$, where $D_1(x,y)$ is the depth value at pixel x,y of the first image; $D_2(x,y)$ is the depth value at pixel x,y of the second image; and C(x,y) is the resultant categorisation value at pixel x,y. Where $D_1(x,y) \geq D_2(x,y)$, C(x,y) is set to 1.

The above-described process can, at the same time, identify (at step 930) regions that are confidence regions (in one of the three sub-categories) and regions that are uncertainty regions. Alternatively, the confidence regions may first be identified and the uncertainty regions may be separately identified. Once the confidence regions have been identified and sub-categorised and the uncertainty regions have been identified, the entire area of the augmented reality has been placed into one of four categories. The uncertainty regions are regions in which there is some doubt as to which of the first image 500 and the second image 550 is to be rendered. Where the comparison of the depth values is such that the magnitude of the difference in depth values at a location is less than a predetermined threshold θ, the location may be regarded as part of an uncertainty region. This is because the depth values are considered to be so close to one another that it is possible that errors in the capture of the depth value from the real scene in that region may lead to an erroneous result. These regions are then processed further, as will be described below. In the categorisation map of FIG. 10, elements of the uncertainty region are indicated by numeral 3 and are also shaded.

Another approach for identifying uncertainty regions, which can be used in place of or in addition to the above-described approach, is to consider the absolute values of depth values captured from the real scene. In the present example, this may involve performing a test on each of the captured depth values. For example, an RGBD camera may produce a particular value which is indicative of an erroneously captured depth value. For example, it may be expected that a depth value should fall within a predetermined range and that a value outside of this range indicates an erroneous depth measurement. The RGBD camera may optionally be configured to provide a specific depth value to indicate that an error occurred in the captured value. Accordingly, by using different methods it is possible to identify incomplete or erroneously captured depth values.

It is also possible to perform an "in-fill" function in order to transform an uncertainty region into a confidence region on the basis that the uncertainty region is wholly surrounded by a confidence region of a particular subcategory. This process can be performed during the categorisation process in which confidence and uncertainty regions are identified. Specifically, where a region is wholly surrounded by "in-front category" sample points, it can be inferred that the sample points in that region should be completed based upon the surrounding categorisation. Accordingly, the categorisation value of the uncertainty region ("3") can be changed to match the surround categorisation. As such, the area of uncertainty region to be processed is reduced before processing is performed. In this way, fewer pixels in the uncertainty region need to be processed in the subsequent processing steps to determine which colour should be used in the augmented reality image. The amount of processing needed to generate the augmented reality image is therefore reduced.

The "in-fill" function may also consider the size of the area to be in-filled before performing the in-filling. Specifically, a large area to be in-filled may indicate that the area is not erroneously uncertain but instead is actually part of another object. It may also be possible to consider the size of the confidence region during in-filling to ensure that the confidence region is sufficiently large to have confidence that the "in-filling" will not create errors in the categorisation. An example of a region of the categorisation map that can be in-filled is illustrated with reference to FIG. 10, in which two sample points denoted "3" are categorised as forming an uncertainty region. The two sample points can be in-filled and changed to take the value "1" since the surrounding sample points have the same categorisation value.

The categorisation map 1000 indicates, for regions of the augmented reality image 600, which regions of the image are considered to be confidence regions in which the determination as to which of the first and second images to be rendered is made with a degree of confidence. Regions in which some uncertainty as to which of the first and second images to be rendered are indicated as uncertainty regions and are labelled by numeral 3, which are also shaded. Numeral 2 indicates confidence regions in which the real scene of the first image is to be rendered in place of the virtual object 104 of the second image 550. Numeral 1 indicates the confidence regions in which the virtual object 104 of the second image 550 is to be rendered in place of the colour values of the real scene 400.

It will be appreciated that for regions of the augmented reality image 600 in which there is certainty as to which of the first image or the second image is to be used for rendering, it is possible to determine a blending factor to determine the degree to which first 500 and second 550 images are blended. The blending factor in these regions may be a binary number which indicates which of the two images to wholly render at a pixel. A blending factor value may be regarded as an initial alpha matte value as will be explained in more detail later.

As can be seen from FIG. 10, a large proportion of the categorisation map 1000 includes an "off object" region marked by reference sign "-". This will be described in further detail below.

Off object regions may be identified as a sub-category of the confidence region in which the two images do not overlap one another. Put another way, there may be regions in which the first image 500 and/or the second image 550 are not aligned with one another. For example, where the first image 500 is an image of a real scene and the second image 550 is an image of a virtual object 104, it may be that the second image 550 is smaller than the first image 500 and is only as large as the size of the virtual object 104.

Accordingly, when the first 500 and second 550 images are aligned with one another or a correspondence between colour values in the two images is generated, there may be regions of the first image 500 for which there is no corresponding region of the second image 550. Such regions may be deemed to be "off object" regions since, for these regions, no comparison of depths is required (or possible). As such, it is possible to mark these regions such that they are not processed further. In this way, it is possible for the amount of processing required to generate the augmented reality image 600 to be reduced.

The off object regions form part of the confidence regions since the determination as to which of the first image and the second image to render can be made with confidence. Put another way, since the one of the first and second images is not present in an off object region, it will be the colour values of the present object in the off object region that will be used to render the corresponding colour values of the augmented reality image 600.

In some implementations, the depth values and the colour values may not be directly aligned in position. Therefore, when aligning a depth map of the depth values with the colour images, it may be that boundaries of objects in the depth map extend beyond those in the colour image. As such, some depth value points may be erroneously included in the "in-front" region. In order to overcome this problem a morphological operator (e.g. an erosion operator) may be used to re-categorise confidence regions near a boundary between regions from either "in-front" or "behind" confidence sub-categories to an uncertainty region. This will be explained below.

Figure 11A:
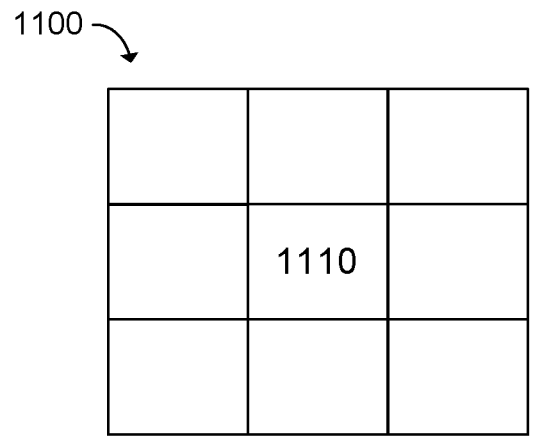
FIGS. 11(a) and 11(b) illustrate an example categorisation map having been processed using an erosion operator.

FIG. 11(a) illustrates an erosion kernel 1100 in accordance with an example. The erosion kernel 1100 in this example is a 3×3 pixel kernel in which the centre position of the kernel 1110 is to be placed upon a position in a confidence region of the categorisation map 1000 which is located near to an uncertainty region. The erosion operator acts to compare all locations in the erosion kernel 1100 to determine whether or not all locations in the erosion kernel are all in a confidence region.

For elements in a confidence region located near to an uncertainty region, the centre 1110 of the erosion kernel 1100 is placed at that element and, where there is another point within the erosion kernel 1100 that is in an uncertainty region, the element in question is re-categorised as being part of an uncertainty region. In this way, the uncertainty regions are widened to ensure that issues in alignment do not result in spurious results in the rendered image. It will be appreciated that the size of the erosion kernel 1100 may be varied depending upon the particular application of the described methods. Categorisation map 1150 illustrates the result of applying the 3×3 size erosion kernel 1110 to the categorisation map 1000 of FIG. 10. As can be seen, the size of the uncertainty regions (illustrated as shaded regions) has been increased.

Figure 9:
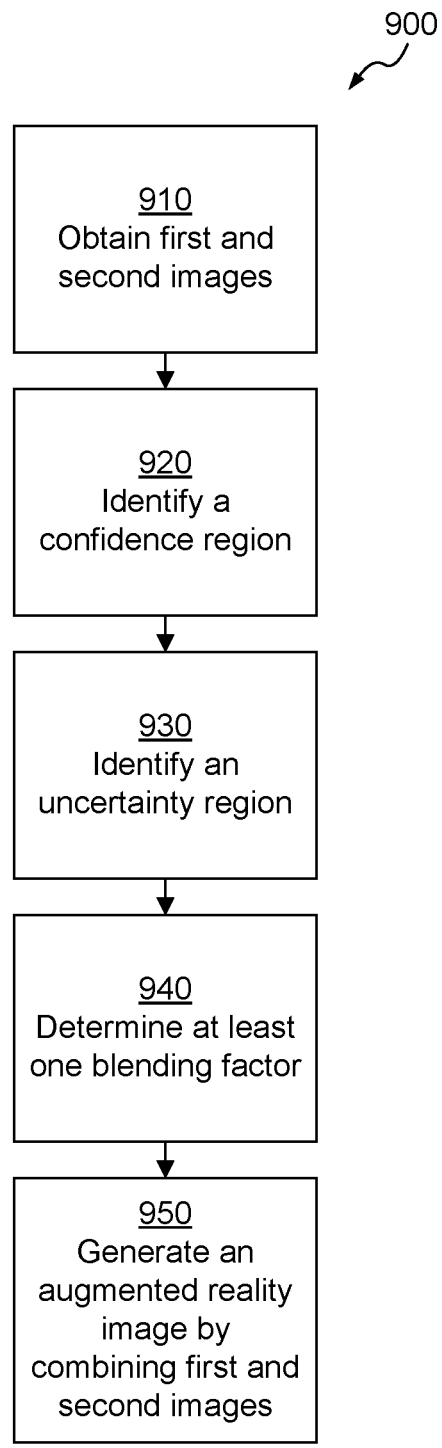
FIG. 9 illustrates a flow chart of an example method for generating an augmented reality image.

At the end of step 930 of the method of FIG. 9, a categorisation map 1100 may have been generated in which all regions of the augmented reality image are categorised into one of two primary categories, namely an uncertainty region or a confidence region. As previously mentioned, the confidence region may also be sub-categorised as "in-front" or "behind" categories and other portions of the categorisation map may be determined to be "off object", which may also be determined to be part of a confidence region.

The uncertainty region may be further processed to determine a value for a degree to which the first 500 and second 550 images are to be combined within these regions. Two possible approaches for processing the uncertainty region are set out below in relation to step 940.

Alpha Matte

In order to combine the first image 500 and the second image 550 to generate the augmented reality image 600, blending factor values may be determined which combine to form an alpha matte. The blending factor values of the alpha matte indicate the degree to which the corresponding colour values of each of the first image and the second image contribute to the colour at a corresponding location of the augmented reality image 600. Blending factor values of the alpha matte may take the value '0', '1', or any value in between '0' and '1'. Where the blending factor value at a particular location of the alpha matte is '0' or '1', a single colour from either the first or second image is selected and rendered in the augmented reality image. Where the blending factor value is a value in between '0' and '1', a blend of the corresponding colours of the first and second images is generated and used when rendering that corresponding position in the final augmented reality image. By blending, for use at a particular location in the final augmented reality image, two colours each from the first and second image, it is possible to smooth a transition in colour between a rendered first image and a rendered second image in the augmented reality image, thereby reducing visual artefacts in the augmented reality image.

Figures 12, 13, 14:
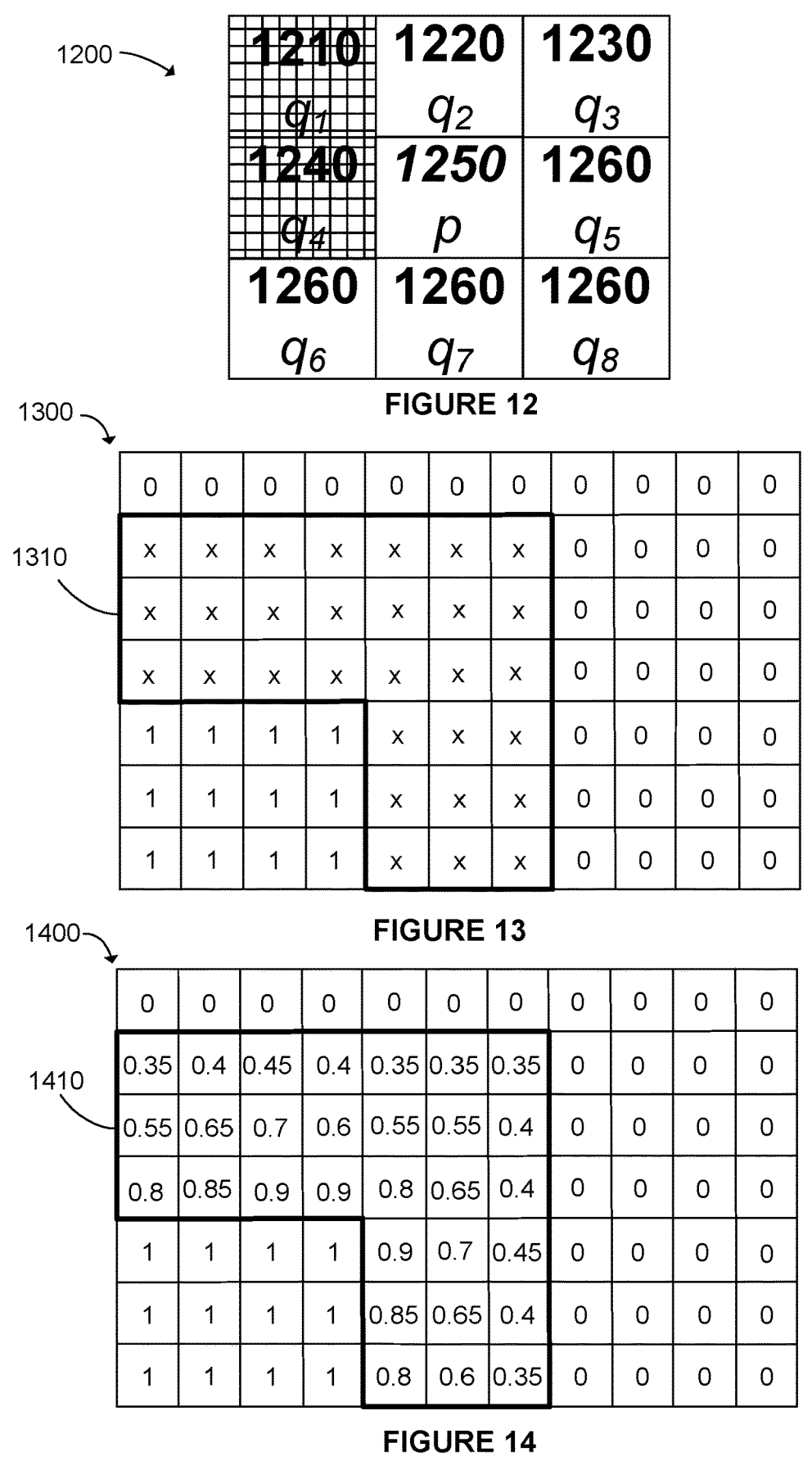

In the present example, the blending factor values of the alpha matte are determined in different ways for the confidence region and the uncertainty region. Specifically, in the confidence region the blending factor values are based upon the sub-categories of the confidence region. Specifically, a point in the categorisation map being assigned as a "behind" sub-category may optionally translate to a blending factor value of 1 in the corresponding position in the alpha matte. Similarly an "in-front" sub-category may translate to a blending factor value of 0 as illustrated in FIG. 13. The relationship between the blending factor values and the degree to which each image is to contribute to the augmented reality image will be described later.

Regions of the categorisation map 1300 that are designated as uncertainty regions are not initially assigned an initial alpha matte value since there is doubt as to which of the first 500 and second 550 images is to be used in the corresponding region of the augmented reality image 600.

Blending factor values for the uncertainty regions can be generated by one of a number of different methods. In general, determining at least one blending factor value in the uncertainty region is based upon a similarity between a colour value in the uncertainty region and at least one colour value in the confidence region. In this way, it is possible to use colour values in known regions of the images to infer in which region a particular portion of the image should be categorised based upon the degree of colour similarity.

Two specific approaches for determining the blending factor values in uncertainty regions are set out below. Both methods make use of colour information outside of the uncertainty region (i.e. in a confidence region) in order to determine the degree to which portions of the uncertainty regions are similar to portions of the confidence regions.

Cross Bilateral Filter

One approach to performing step 940 is to use of a cross bilateral filter (CBF) to determine blending factor values (i.e. alpha matte values) for uncertainty regions.

A cross bilateral filter is similar to a bilateral filter, but differs in that the source of the weights in the filter (known as the joint data) differ from those to which the filter is applied. In the approach described herein, the colour values of one of the two images (i.e. the first or the second image) are used to determine blending factor values in the uncertainty region. More specifically, in the present example, the colour values of the first image of the real scene are used when applying the CBF to the uncertainty region, as will be described in more detail below. In other examples, the CBF may be applied in the uncertainty region based on colours of a second (or third) image, for example the second image of the virtual object as described herein.

A cross bilateral filter is defined generally as follows:

$$BF[I]_p = \frac{1}{W_p} \sum_{q \in S} G_{\sigma_s}(\|p - q\|) G_{\sigma_r}(|I(p) - I(q)|) I_q$$

Where $W_P$ is a normalisation factor that normalises the resultant value for pixel p between 0 and 1, I is the original input image to be filtered (which in this case is the colour values from the first image), and subscript p is the coordinate of the current pixel to be filtered. For each pixel p to be filtered, the cross bilateral filter determines a weighted average of pixels in a set S of pixels based upon two Gaussian functions, $G_{\sigma_s}$ and $G_{\sigma_r}$. $G_{\sigma_s}$ weights each pixel q according to the distance of the pixel q from the pixel in question p based upon a Gaussian distribution. Similarly, $G_{\sigma_r}$ weights the same pixel q according to the difference in a particular value between the pixel q and the pixel in question p.

The use of the cross bilateral filter is configured in the present example filter in that $G_{\sigma_r}$ is applied based upon differences in colour values between the pixel in question of the first image and other colour values captured by the capture device 200 that fall within the confidence region.

The set S is determined based upon a filter kernel 1200, which forms a region around the pixel in question, p, and calculates a sum of all pixel values within the pixel kernel 1200. The pixel kernel may include all pixels within a predetermined distance of the pixel in question, or may be formed as a box of fixed size. For example, the pixel kernel may be a 3×3 pixel kernel with the pixel in question, p, positioned at the centre.

The cross bilateral filter used in the present arrangement makes a determination as to which pixels in the set S are located within uncertainty regions and which pixels in the set S are located within confidence regions. This may be determined based upon the values in the categorisation map. In the present approach, pixels in the set S that are located within uncertainty regions are provided with a zero weight and are thus disregarded. As such, uncertainty regions do not contribute to the blending factor value produced for a pixel in question, p. In this way, the determination of a blending factor value at a pixel does not take into consideration other pixels at which there is doubt as to the reliability of the depth values.

According to an example, a cross bilateral filter can be implemented with the use of a 3×3 pixel kernel 1200. The pixel kernel 1200 may be configured to use a colour value of each pixel that neighbours a pixel in question, p, within the kernel. As such, a 3×3 pixel kernel 1200 may typically involve the calculation of 8 different values for a particular pixel p, which may then be normalised between a value of 0 and 1. This process is repeated for each pixel until all of the pixels of the augmented reality image has been processed. However, in the present approach it may be that, for each processed pixel, fewer pixels are considered since some of those pixels may fall within an uncertainty region and are thus ignored.

An example filter kernel 1200 is illustrated in relation to FIG. 12 in which a pixel in question, p, is shown in the centre of a 3×3 pixel filter kernel 1200. The predetermined distance for this kernel can then be regarded as 1. In this arrangement, the colour values of the eight pixels that neighbour the pixel in question, p are considered. As illustrated in FIG. 12, two of the neighbouring pixels $q_1$ (1210) and $q_4$ (1240) are identified as being located in an uncertainty region based on the categorisation at the respective locations of each pixel. As such, the application of the cross bilateral filter does not take into consideration pixels $q_1$ and $q_4$. Instead, the cross bilateral filter is applied on the basis of the colour values at pixels $q_2$, $q_3$, $q_5$, $q_6$, $q_7$, and $q_8$ and the normalisation factor $$\frac{1}{W_P}$$

will be adjusted to a value based on the fact that only six pixels are taken into consideration. In general, the normalisation factor $$\frac{1}{W_P}$$

will be adjusted to account for the number of pixels that are taken into consideration.

Set out below are the two Gaussian functions, $G_{\sigma_r}$ and $G_{\sigma_s}$ which are used in the present example to apply the cross bilateral filter to generate the blending factor values.

$G_{\sigma_r}$ provides a weighting factor relating to the similarity in colour between a pixel of interest p in the first image 500 and another pixel q, where the pixel q is a pixel in the range of the kernel in the first image 500. In this example, the pixel is located in an adjacent pixel since the filter kernel size is 3×3.

$$G_{\sigma_r} := \exp\left(\frac{-0.5 \cdot d(p,q)^2}{\sigma_{colour}^2}\right)$$

where d is a colour distance metric. d provides a metric of the similarity in colour between the pixel in question, p, and one of the pixels in the kernel. In this example, the similarity in colour is determined based upon the Manhattan distance in RGB space. Specifically, distance d is defined by the following equation, where $(p_r, p_g, p_b)$, $(q_r, q_g, q_b)$ are the red (r), green (g), and blue (b) components of the colour pixels p and q:

$$d(p,q) := |p_r - q_r| + |p_g - q_g| + |p_b - q_b|$$

Advantageously, the Manhattan distance is particularly useful for determining the degree of colour similarity in the present approach since it has produced low mean square error (MSE) relative to ground truth mattes in testing and is efficient to evaluate.

Another Gaussian function $G_{\sigma_s}$ used in the cross bilateral filter is described below. For pixel in question p, the function provides a weighting factor based upon the distance between the pixel in question p and a pixel q located within the pixel kernel. The distance weighting $G_{\sigma_s}$ is given by the following equation:

$$G_{\sigma_s} := \exp\left(\frac{-0.5 \cdot ((p_x - q_x)^2 + (p_y - q_y)^2)}{\sigma_{space}^2}\right)$$

Where $p_x$, $q_x$, $p_y$, and $q_y$ are the x and y coordinates of pixels p and q within the image. The distance may be a count of the number of pixels between the pixels based on a pixel coordinate system.

Therefore, for each pixel p in the uncertainty region, a blending factor value is provided by the cross bilateral filter based upon corresponding colour values in confidence regions within the filter kernel. The normalisation factor ensures that the generated value lies between 0 and 1.

In other arrangements, additional or alternative colour values could be used to generate the blending factor values. Different colour values in the confidence region in the first image may be utilised to perform filtering. For example, a larger filter kernel or a sparse sampling scheme that selects pixels that are not adjacent to the pixel in question may be used to perform filtering based upon a larger area of colour values in the first image of the real scene. As such, the filtering is performed in a less localised manner which would reduce the impact of any local colour defects in the first image on the generated augmented reality image. Additionally or alternatively, colour values from a third image of the same real scene may be used.

The blending factor values generated by the cross bilateral filter in the uncertainty region may then be combined with the initial blending factor values generated for the confidence region that are illustrated in FIG. 13. The combined blending factor values of the confidence and uncertainty regions may form a complete alpha matte which covers the scene so that, for each pixel of the first 500 and second 550 image, a corresponding blending factor value (i.e. alpha matte value) is determined. As such it is possible to combine the first 500 and second 550 images based on the complete alpha matte.

Figure 11B:
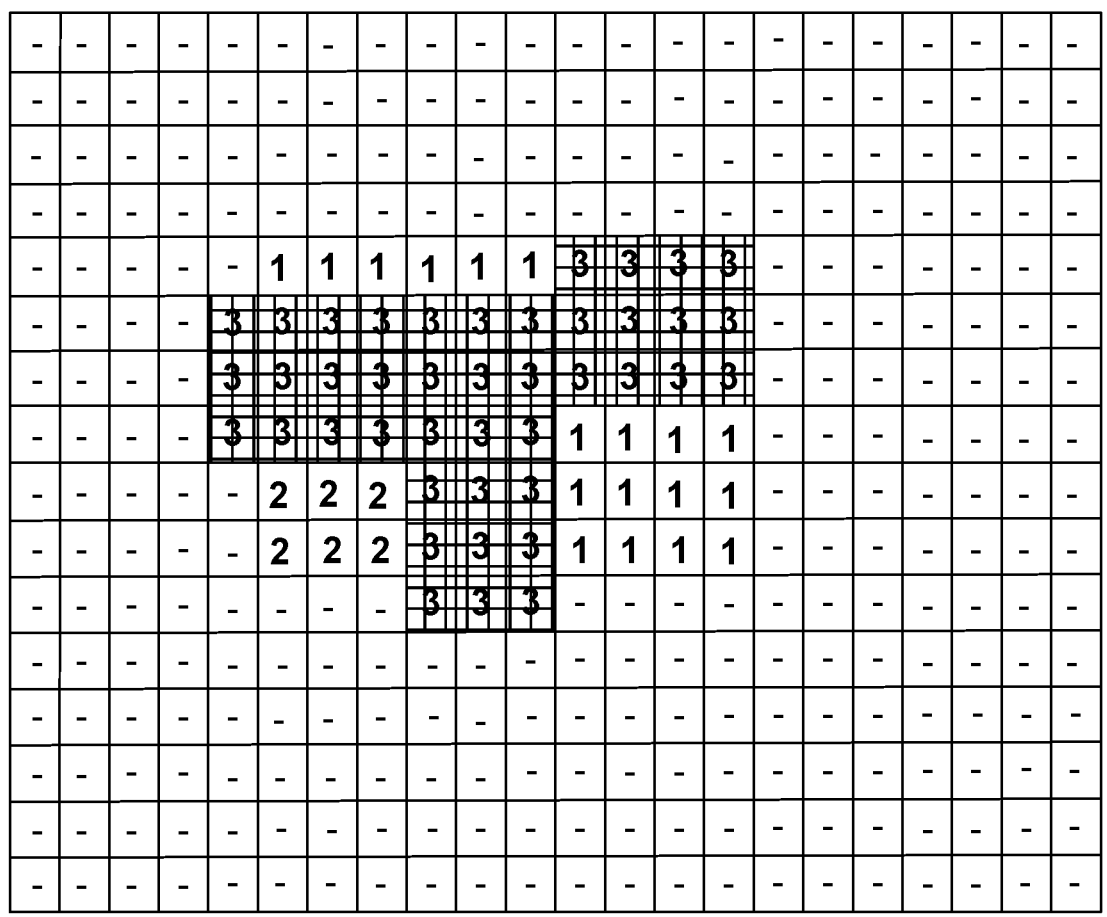

An example of an alpha matte 1200 formed solely of values generated within confidence regions is illustrated in FIG. 13 based upon the category map 1100 of FIG. 11. As can be seen, blending factor values in the alpha matte 1300 correspond with the sub-categorisation of the confidence regions in the categorisation map 1100. For example, an initial blending factor value (i.e. alpha matte value) of 0 corresponds with confidence regions in which the portions of the second image 550 of the virtual object are to be displayed in front of the corresponding portions of the first image 500.

As can be seen from FIG. 13, portions of the alpha matte 1300, indicated by 'x' in region 1310 have not been allocated an initial blending factor value since these regions of the alpha matte correspond in position with uncertainty regions. It is then each of these portions of the alpha matte that are processed, where each pixel is regarded as p in the above-described equations.

Blending factor values (i.e. alpha matte values) may be determined for uncertainty regions. An updated complete alpha matte 1400 is illustrated in FIG. 14 in which additional blending factor values have been added (for example using the cross bilateral value) in the uncertainty region to generate a complete alpha matte 1400.

The generated complete alpha matte 1400 can be used to combine the first image 500 and the second image 550 to generate an augmented reality image 600. This will be described in more detail later.

Iterative Method

An alternative approach to determining blending factor (i.e. alpha matte) values for the uncertainty region is set out below and will be referred to as the "iterative method". The iterative method differs from the cross bilateral filter in that the cross bilateral filter can be considered to be a localised approach to generating blending factor values in the uncertainty regions whilst the iterative method can be considered to be a large-scale approach.

In this alternative approach, steps 910, 920, and 930 of FIG. 9 are performed in the same manner as for the cross bilateral filter approach set out above so as to generate a partially completed alpha matte, such as the partially completed alpha matte illustrated in FIG. 13.

Specifically, both the iterative method and the cross bilateral filter receive a partially completed initial alpha matte in which alpha matte values are determined for confidence regions. The iterative method described herein provides an alternative approach for determining the blending factor values for uncertainty regions.

In the iterative method described herein, blending factor values for an uncertainty region are determined by minimising the sum of squares of two error metrics for each element in the uncertainty region. The two error metrics used in the following example, are designed to encourage the formation of a visually pleasing alpha matte, with a low error.

For a partially completed alpha matte M, such as the alpha matte illustrated in FIG. 13, initial estimated values for the alpha matte values that fall within a uncertainty region (such as region 1310) are determined.

These estimated values may simply be set to 0.5 which is a balanced initial value that is to be refined during execution of the iterative method. An example of such an initial alpha matte used in the execution of the iterative method is illustrated in region 1510 of FIG. 15.

In other arrangements, initial values for the alpha matte values in an uncertainty region may be determined using more sophisticated approaches, for example based on an initial desired blend across an uncertainty region, for example where the uncertainty region forms a boundary between confidence sub-category regions.

Since the method described herein is iterative, a better initial value may reduce the number of iterations of the method required to reach a predefined acceptable error level. For the purposes of describing the operation of this method, the alpha matte values for regions of the alpha matte that fall within uncertainty regions are initially assigned a value of 0.5. The iterative method is performed only on the alpha matte values which have an initially assigned value (e.g. alpha matte values in the uncertainty region).

In the following example, a blending factor value is generated for each point in the categorisation map categorised as in being in an uncertainty region based upon the minimisation of a gradient metric and a colour metric.

The gradient metric is designed to encourage an alpha matte which contains large flat regions with low image gradients, whilst allowing a small proportion of pixels to have high gradients, so as to define boundaries between 0 and 1 alpha matte values within the alpha matte. The gradient metric is selected in this way to reflect the properties of mattes in the typical situation where an image of a virtual object is considered with respect to an image of an opaque real object. For example, there may be large flat regions of the matte with zero gradient, and a smaller number of pixels along edges with a very high image gradient. Other shapes for the gradient metric may be selected based upon the content of the images to be used to generate the augmented reality image 600.

The gradient metric $\varepsilon_{gradient}$ at a pixel p in matte M is illustrated in the equation below:

$$\varepsilon_{gradient}(M,P):=1+\ln(e^{-1}+G(M,p))$$

where G(M,p) is a gradient value defined by the below equation. The gradient value is an estimate of the sum of squared partial derivatives, where $N_4(p)$ is the 4-neighbourhood of position p in each of the four cardinal directions.

$$G(M, p) := \sum_{q \in N_4(p)} (M(p) - M(q))^2$$

Figures 15, 16:
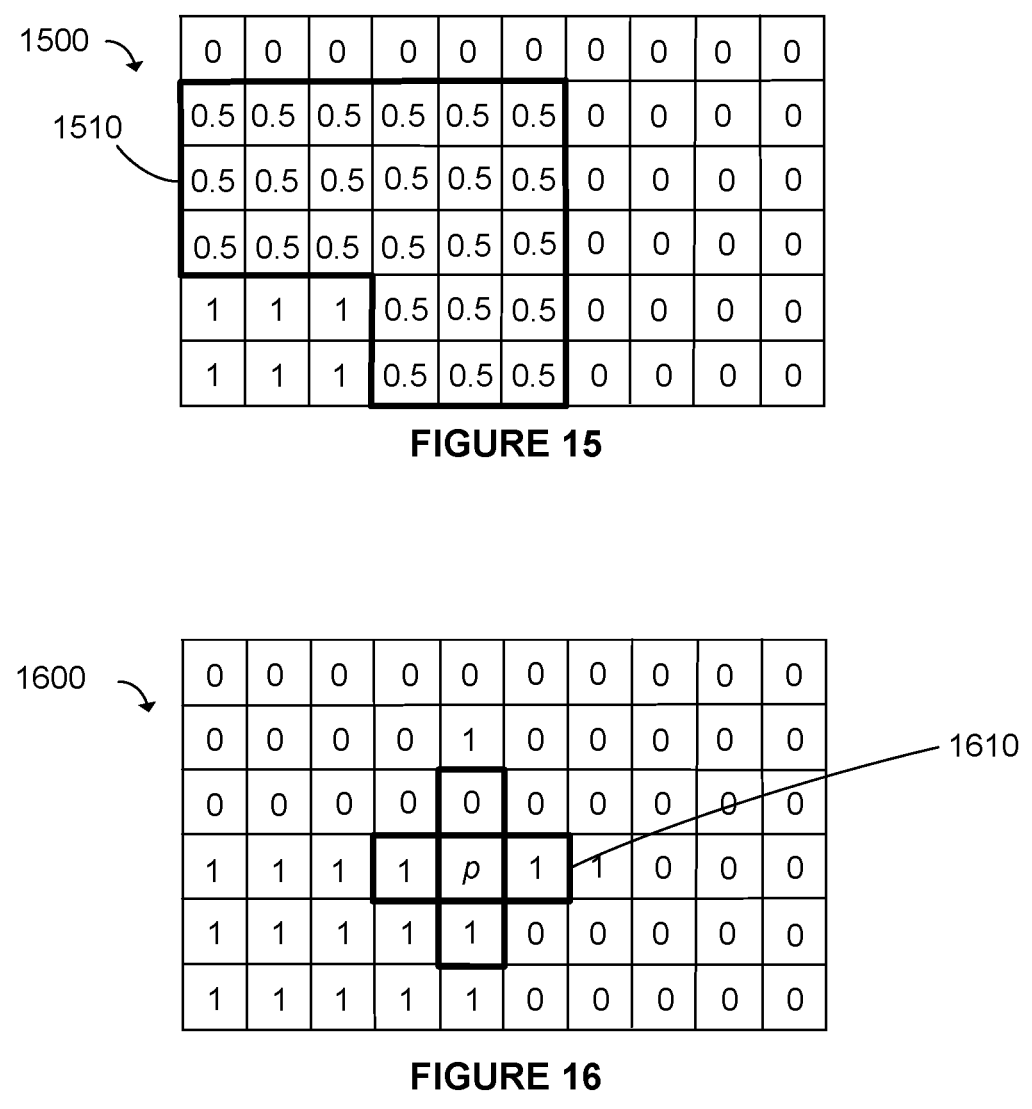

An example of the 4-neighbourhood at p is illustrated in FIG. 16 in which the alpha matte value in each cardinal direction is compared with the matte value at position p illustrated at reference numeral 1610. Accordingly, four comparisons are made and the squared differences are summed to generate a value for G(M,p) at p. In the example of FIG. 16, the G(M,p) value would be 1 where the initial matte value at p is 0.5.

Figure 18:
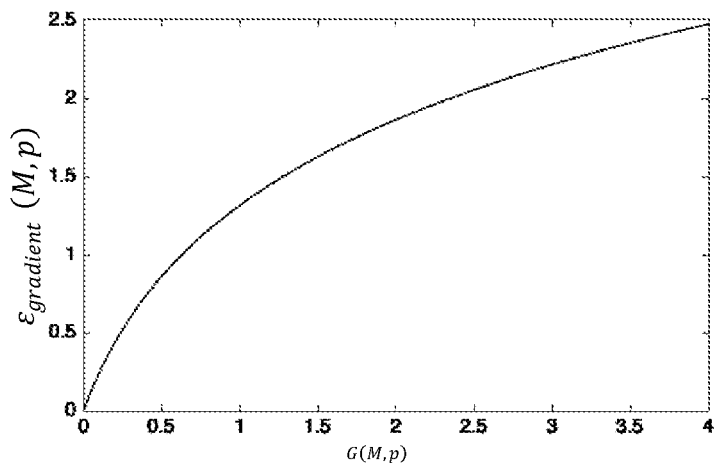
FIG. 18 illustrates a plot of error gradient as a function of gradient values.

As set out above, the gradient metric $\varepsilon_{gradient}(M,P)$ is based on the function $y=1+\ln(e^{-1}+x)$. A plot of the gradient metric as a function of the gradient value is illustrated in FIG. 18. As can be seen, the gradient metric seeks to suppress (with respect to an error function y=x) gradient values in the middle of the range of gradient values. Put another way, low gradients and high gradients, such as the values for gradients at 0 or 4, are emphasized.

A second metric used in the iterative method is a colour metric designed to make use of colour information, by comparing the colour similarity of pixels in the uncertainty region with pixels that have been categorised in the "in-front" category, i.e. pixels in the foreground) and pixels that have been categorised in the "behind" category (i.e. pixels in the background of an image).

An example approach to defining the colour metric is to define two Mixture of Gaussians (MoG) models that are each fitted to colour samples taken from one of the foreground "in-front" and background "behind" colour values in the confidence region, based on the sub-categorisation of the confidence regions into "in-front" and "behind" regions. MoG models are particularly useful in the present implementation due to their multimodal nature, which allows them to handle cases where objects in a scene are surrounded by multiple objects of different colours, or objects with multiple different colours (e.g. due to varying object albedo or non-uniform lighting). Additionally, MoG models provide additional robustness to noise in the colour samples, as compared to finding nearest neighbours in the sample set.

For an image, the colour samples for the MoG models are selected from the sub-categorisations of the confidence regions near the uncertainty region. In order to select the colour samples, a dilation process is applied to the uncertainty region and the result of the dilation is intersected with the sub-categorised confidence pixels using an Expectation Maximisation (EM) algorithm. The EM algorithm process obtains regions from the respective "in-front" and "behind" categorised pixels within a small band of the uncertainty region.

The in-front and behind regions may be represented as one or more binary images, in which sample points inside the region are represented as a '1', and sample points inside the regions are represented by a '0'. The uncertainty region is then dilated, to increase the size of the uncertainty region by a few pixels. Then, in an example implementation, a pixel-wise binary AND is applied to the dilated uncertainty region and the "in-front" and "behind" regions (e.g. the "in-front" and "behind" images) to find the area of overlap. In practice the area of overlap will be the separate "in-front" and "behind" regions within a predetermined distance of the uncertainty region, as defined by dilation kernel which is used to define the degree to which the uncertainty region is dilated. By following this approach, two additional regions are defined in which the dilated uncertainty region overlaps respective "in-front" and "behind" regions. Since the determination of the two new regions takes into consideration only "in-front" and "behind" regions, "off object" regions and uncertainty regions are not taken into consideration.

Having performed the above step, two MoG models are generated, each of which consists of scalar weights and parameters (mean, variance) for N 3-dimensional Gaussian functions (where N is the number of components in the mixture). These models provide a concise summary of the distribution of the foreground and background colour samples in the confidence region based upon the sub-categorisation of the alpha matte. For example, the number of Gaussians per model N may be set to 5. However, the number of Gaussians used in the model may vary and will be selected based upon a trade-off between performance and quality.

Once the MoG models have been fitted to the foreground and the background, the colour metric $\varepsilon_{colour}$ is defined using the following equation:

$$\varepsilon_{colour}(M, C, p) := \left| M(p) - \frac{P_{behind}(C(p))}{P_{behind}(C(p)) + P_{infront}(C(p))} \right|$$

Wherein $P_{behind}$ and $P_{infront}$ are the respective probabilities that the colour sample at pixel p under the MoG models is fitted to the "behind" and "in-front" pixel categories. These probabilities are defined as the probability of the sample under the most likely Gaussian in each mixture. The colour error metric therefore encourages an appropriate local value for each pixel, whereas the gradient metric encourages an appropriate global structure for the matte. The MoG models are respectively fitted to the colours from the first image (e.g. the colours of the real scene) in the "in-front" region and the "behind" region and background colours respectively and are fitted to colours from the first image (e.g. the real image). The MoG models are fitted to maximise the probability of the observed foreground/background colour samples using the Expectation-Maximisation algorithm.

As will be appreciated, it is possible to use '0' and '1' values to represent different categorisations (e.g. a '1' can represent an "in-front" or a "behind" region, provided a different value represents the other region). For example, if different values were used in the category map to represent the in front and behind regions, it may be necessary to swap the $P_{behind}(C(p))$ and $P_{infront}(C(p))$ probabilities in the above equation.

Having generated the colour error metric and the gradient error metric, the two metrics are minimised using an approach for minimising two errors metrics for each point in the uncertainty region of the alpha matte. One approach is to use the Levenberg-Marquardt algorithm to minimise the two error metrics for each point in the uncertainty region and thereby produce alpha matte values for the uncertainty region.

The Levenberg-Marquardt algorithm (LMA) operates upon a parameter space $\Omega \subseteq \mathbb{R}^n$. In the present example, the parameter space is the space of possible alpha mattes. That is, each element of $\Omega$ is a vector $x=(p_1, \ldots, p_n)$, where each $p_i$ is a pixel value from the uncertainty region of the alpha matte, such that $\Omega=[0,1]^n$, wherein n is the number of pixels in the uncertainty region. In the LMA, the aim is to minimise the sum of squares of errors. As defined above, the iterative approach defined herein makes use of error functions $r_j:\Omega \to \mathbb{R}$, for $j \in 1, \ldots, m$. The error functions are defined as the gradient error metric and the colour error metric (as described above), each applied at each pixel in the uncertainty region.

The LMA is therefore configured to minimise the sum of squares of each of the error functions, using the following equation:

$$f(x) := \frac{1}{2} \sum_{j=1}^{m} r_j(x)^2$$

As described above, the values of the alpha matte in the uncertainty region are initialised to a value defined as the initial estimate of x, termed herein as $x_0$. At each step of the iteration of the LMA, a small step delta is taken, i.e. $x_{i+1}:=x_i-\delta_i$ so that $f(x_{i+1})<f(x_i)$, using gradient information.

Let $r:\Omega \to \mathbb{R}^m$ be a residual vector, defined by $r(x):=(r_1(x), \ldots, r_m(x))$ that can be differentiated with respect to x to obtain a Jacobian matrix $$J := \left[ \frac{\partial r_j}{\partial p_i} \right].$$

Since the two errors metrics used in the present example are differentiable, J can be found analytically. The updates can be computed as follows:

$$\delta_i:=(J^TJ+\lambda \text{diag}(J^TJ))^{-1}J^Tf(x_i)$$

The above equation is a form of combination of a first order and second order approximation to f, and the value $\lambda \in \mathbb{R}$ controls the weighting of the two approximations. In order to perform the above computation, a matrix inverse needs to be performed as shown above. Whilst this matrix can be large, the matrix is also sparse and symmetric, which means that $\delta$ can be efficiently found using a sparse Cholesky solver.

In order to perform the LMA, the following steps are performed in order to minimise the two error metrics:
1. Calculate the Jacobian matrix J of the error metrics analytically, in terms of x.
2. At each step:
   a. Evaluate the Jacobian matrix J at the current estimate $x_i$;
   b. Solve the system $(J^TJ+\lambda \text{diag}(J^TJ))\delta_i=J^Tf(x_i)$ for $\delta_i$, using a sparse Cholesky solver;
   c. Find the new estimate $x_{i+1}:=x_i-\delta_i$;
   d. Evaluate the error f $(x_{i+1})$; and
      i. If the error is sufficiently small, or too many iterations have occurred, halt the LMA;
      ii. If not, determine whether to accept the estimated value for x; and
      iii. Decide whether to change the value of $\lambda$.

The iterative method is particularly suited to applications in which the generation of an augmented reality image is to be performed in real time, for example where a plurality of augmented reality images are to be generated sequentially to form a video sequence. The iterative method may be performed a number of times to reduce the mean squared error (MSE) in the resultant alpha matte. In time-critical applications such as the generation of a video sequence, it is possible to allocate a defined period of time to the generation of the blending factor values in the uncertainty region using the iterative method. Accordingly, the iterative method will be performed as many times as possible with the allocated time period. In this way, it is certain that the iterative method will generate blending factor values in the required time and the error may be minimised within the required time. For example, it is possible to maintain a constant frame rate in an augmented reality video sequence of augmented reality images.

Figure 19:
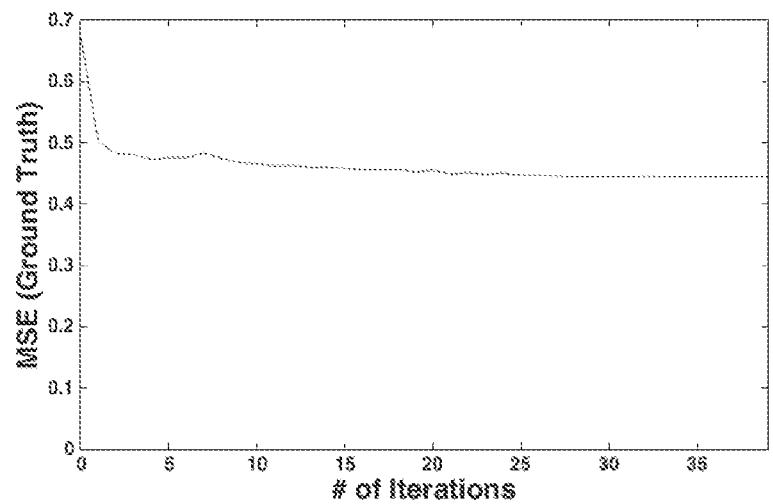
FIG. 19 illustrate a plot of mean squared error as a function of the number of iterations of the iterative method.

FIG. 19 illustrates a plot of MSE error (with respect to a ground truth) as a function of the number of iterations of the method performed. As can be seen, in the example implementation tested in FIG. 19, the MSE is reduced very quickly from approximately 0.675 to 0.5 in less than 5 iterations. Accordingly, the MSE can be reduced within a low number of iterations.

Once the iterative method or the cross bilateral filter approach has been applied, a complete alpha matte is generated for the entire image space, as illustrated in FIG. 14. It is therefore possible to composite the first image 500 and the second image 550 to form an augmented reality image 600, as will be explained in more detail below.

Further Example

Figure 17A:
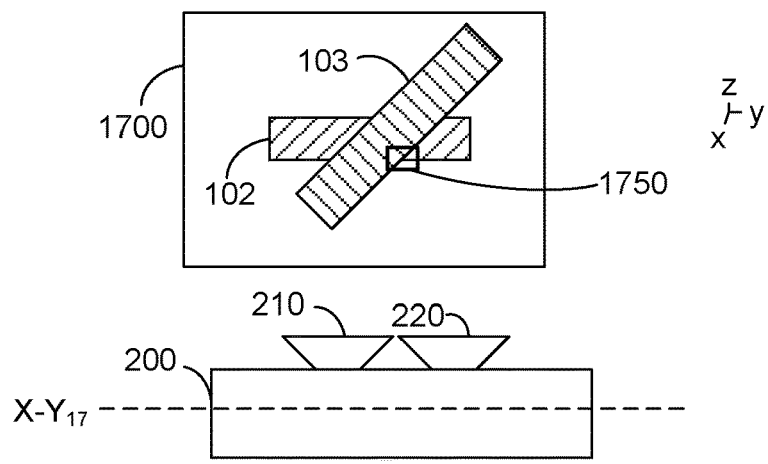
FIG. 17(a) illustrates a plan view of a real scene a partially occluded virtual object positioned therein.
Figure 17B:
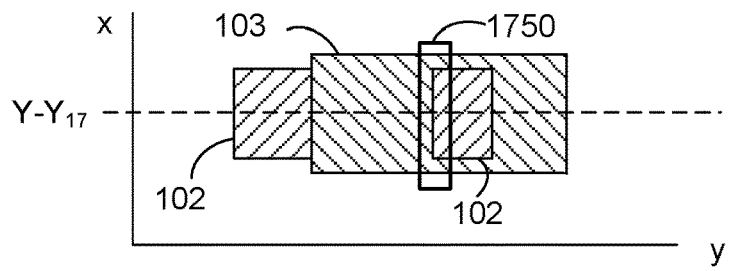
FIG. 17(b) illustrates a view of the real scene of FIG. 17(a) from the viewpoint of plane $X-Y_{17}$.

A further example implementation is illustrated with respect to FIGS. 17(a) to 17(d) below. FIG. 17(a) illustrates an arrangement in which a real object 102 and a virtual object are present in a scene 1700. Capture device 200 is also positioned according to plane X-Y$_{17}$ as previously described with respect to plane X-Y$_4$ of FIG. 4. FIG. 17(b) illustrates line Y-Y$_{17}$ in a similar manner as line Y-Y$_4$ in respect of FIG. 4.

Figure 17C:
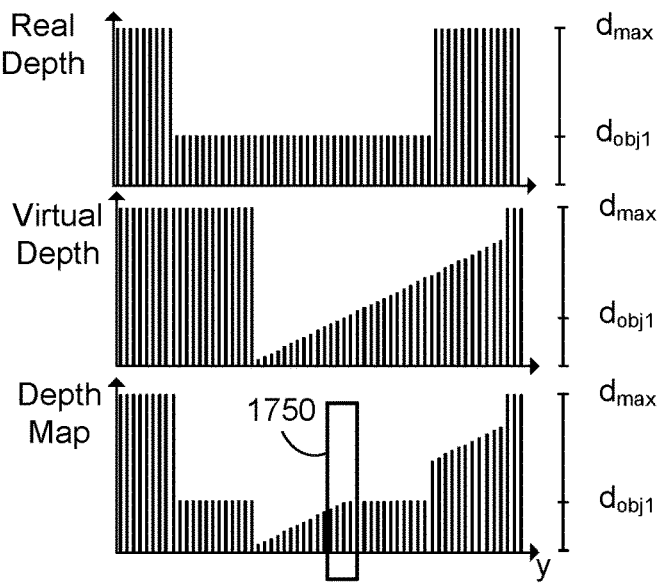
FIG. 17(c) illustrates depth measurements obtained from the capture device through line $Y-Y_{17}$ of FIG. 17(b)

FIG. 17(c) illustrates the real depth values based on the real object 102, the virtual depth values based on the virtual object 103, and depth map generated based upon the real and virtual depth values. As can be seen from FIG. 17(c), the real depth values are at $d_{max}$ where the real object is not located and take the value $d_{obj1}$ when where the real object 102 is located. Similarly, the virtual depth values take the value of $d_{max}$ where the virtual object is not located. However, where the virtual object is located, the depth of the virtual object is used. As can be seen in the example of FIG. 17, the virtual object is not oriented in parallel with the viewpoint at the capture device and thus does not have a constant depth value. The depth value therefore varies along dimension y. Accordingly, there is an intersection point where the real and virtual objects intersect one another in dimension z and the rendered object changes.

Figure 17D:
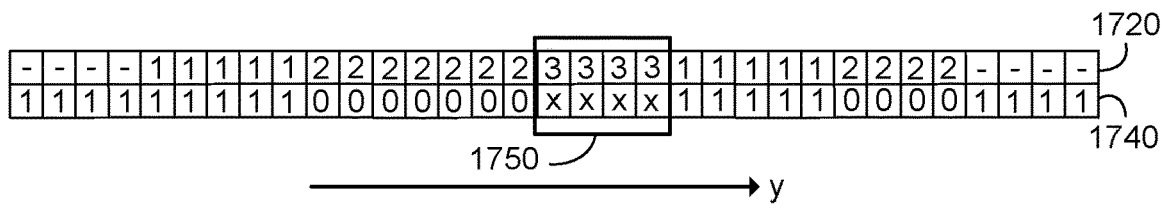
FIG. 17(d) illustrates a series of categorisation values and alpha matte values for the arrangement of FIG. 17(c)

FIG. 17(d) illustrates two rows of data along dimension y from left to right with reference to the depth value graphs of FIG. 17(c). The top row 1720 illustrates example values in a categorisation map along dimension y based on the depth values of FIG. 17(c). The bottom row 1740 illustrates example values in an alpha matte based upon the categorisation values in row 1720.

As can be seen from FIG. 17(d), from left to right, the categorisation values begin with a region of "-" values which indicate that the region of the augmented reality image can be categorised as an "off object" region since the virtual object 103 is not present in this region. The corresponding alpha matte values are therefore "1" so that the colour values of the real scene, rather than the virtual object 103, are used when rendering the augmented reality image. The next values in row 1720 from left to right are categorised as "1" which are "in-front" values that correspond to the confidence region of the scene where the real object 102 has a shallower depth (i.e. is closer) than the virtual object 103. The corresponding alpha matte values are therefore also "1" and the real object is rendered in the corresponding region of the augmented reality image. Following the region of "1" values in row 1720, a region of "2" values are present, which indicate a "behind" category of the confidence region. In this region, the virtual object 103 is rendered in the augmented image using alpha matte values of "0". Following the "2" values in row 1720 are a number of "3" values indicating that this region corresponds with an uncertainty region. The uncertainty region corresponds with the portion of the scene where the virtual object 103 and the real object 102 have similar depth values. This uncertainty region is illustrated in each of FIGS. 17(a) to (d) with reference numeral 1750. It will be appreciated that the width of the uncertainty region depends upon the value of the predetermined threshold. The corresponding alpha matte values in row 1740 are denoted "x" since these values will need to be determined using one of the above-described methods.

Following the uncertainty region 1750 in row 1720, are a series of values "1", "2", and then "-" in the categorisation map. These remaining categorisation values and their corresponding alpha matte values are determined in a similar manner as described above. As can be seen from FIG. 17, there are a total of four boundaries between the regions which are rendered according to the colour values of the first object 102 and the colour values of the second object 103. In the example of FIG. 17, only a single uncertainty region has been identified. This is because, in this example, the difference in depth values for the two objects at these is boundaries has been determined to be greater than the predetermined threshold. If the predetermined threshold were set larger, the categorisation map along line Y-Y$_{17}$ may include larger uncertainty regions as well as additional uncertainty regions.

Compositing

By generating the blending factor values (i.e. alpha matte values) for the uncertainty regions, for example by using the cross bilateral filter or the iterative method as described above, a complete alpha matte 1400 is generated as illustrated in FIG. 14. The complete alpha matte 1400 can be used to generate an augmented reality image at step 950 of the method illustrated in FIG. 9.

An approach for generating the augmented reality image 600 is to apply the following equation based upon the colour values of the first image 500 and the second image 550.

$$c_\alpha := \alpha c_1 \cdot (1-\alpha) c_2$$

For a particular point in the alpha matte, a corresponding pixel of each of the first image 500 and the second image 550 is considered. The alpha matte value $\alpha$ at that corresponding point determines the colour value $c_\alpha$ in the corresponding pixel of the augmented reality image 600. As shown in the above equation, the colour value $c_\alpha$ at a particular pixel in the augmented reality image 600 is a colour combination of colour value $c_2$ of the second image 550 at that pixel and the colour value $c_1$ of the first image 500 at that pixel. In some arrangements, the alpha matte values of 0 and 1 may be switched, for example where the alpha matte values assigned to "in-front" and "behind" pixels are switched. In this arrangement, the values used for $c_1$ and $c_2$ may therefore also be switched.

In the present example, and as shown in FIG. 14, the blending factor values of the alpha matte are defined between a range of 1 and 0 but may take on non-integer values within this range. The blending factor values located in confidence regions have a value of '0' or '1' and thus represent regions of the augmented reality image 600 in which either the corresponding colour value of the first 500 or the second 550 image is wholly used to define the colour value in an associated location of the augmented reality image 600. Put another way, there is no partial blending of the first 500 and the second 550 image in the confidence regions.

Specifically, where the alpha matte value in a confidence region is '1', the above equation provides that the colour at a corresponding pixel of the augmented reality image will be based solely on the colour of the first image of the real scene. Conversely, where the alpha matte value in a confidence region is '0', the above equation provides that the colour at a corresponding pixel of the augmented reality image 600 will be based solely on the colour of the second image of the virtual object.

In the confidence regions a confident determination can be made and thus the alpha matte value is '1' or '0'. It is preferable to determine in uncertainty regions a value of '1' or '0' for the alpha matte. As such, the alpha matte value determined by applying, for example, the cross bilateral filter or the iterative method as described above, may also be 0 or 1. If such values are determined in uncertainty regions, the colour of the augmented reality image at a corresponding pixel will also be based solely on either the colour value of the first image or the colour value of the second image. In the event that all uncertainty regions are given 0 or 1 values, the boundary in the augmented reality image between the sub-categories of the confidence region will be well-defined and thus the occlusion in an augmented reality image will be clearly defined. In practice, as illustrated in FIG. 13, the alpha matte values may not always take the value '0' or '1' in the uncertainty region but instead may have a value in between '0' and '1'. In this case, the resultant colour value that is used in the augmented reality image is a blend of the colour value of the first image and the corresponding colour value of the second image. The alpha matte value will determine the degree to which the colour value of the first and second images contribute to the corresponding colour value in the augmented reality image. Accordingly, where it is not possible to form a confident boundary between objects in an augmented reality image, it is possible to control the transition in colour at the boundary between the first and second images so that fewer artefacts from the occlusion are visible. By performing a blend of the colour values of the first image and the second image in this way, it is possible to lessen the impact of artefacts in a manner that is visually pleasing. Moreover, the approaches described herein allow occlusion on a per-pixel basis and also the control of the transition in colour between first and second images when performing occlusion to be performed on a per-pixel basis.

Performance Comparison

Figure 20:
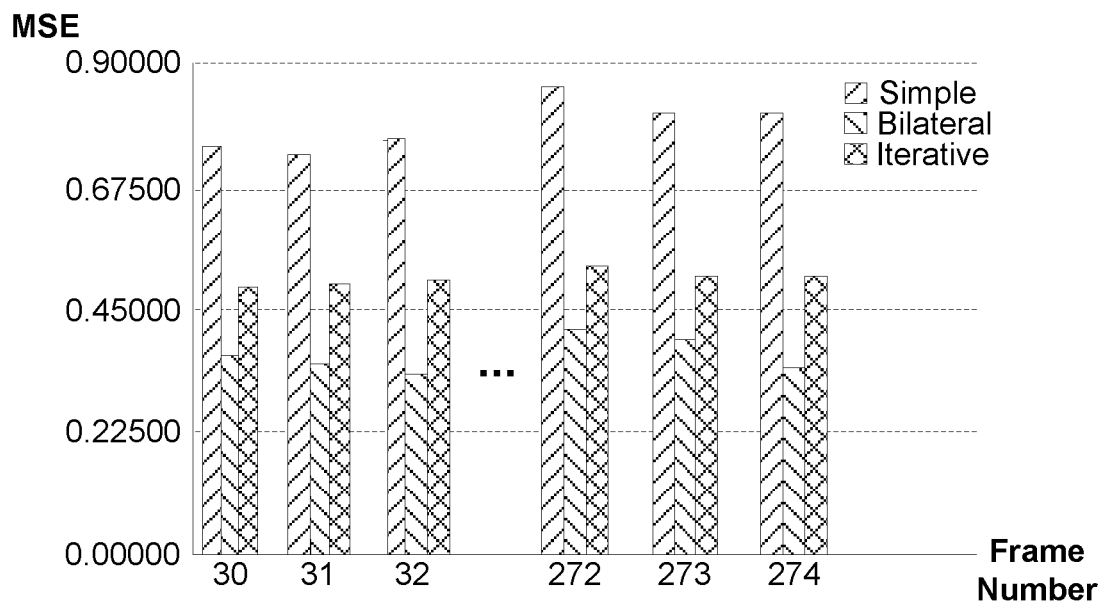
FIG. 20 illustrates the mean squared error for the cross bilateral filter and iterative approaches for a number of frames of a video sequence.

A performance comparison of the iterative method and the cross bilateral filter is illustrated with respect to FIG. 20. In this arrangement, a plurality of frames of a video sequence of a real scene is processed and an augmented reality image has been generated for each frame of the video sequence in which a virtual object has been placed into the real scene and occluded as described above.

The performance of the cross bilateral filter and the iterative method is compared to a simple approach in which it is assumed that determined real depths are accurate and the depth values of the first and second images are simply compared to determine the alpha matte used in combining the images. Put another way, in the simple approach, it is assumed that the entire image is a confidence region and is thus processed accordingly. In the simple approach, any pixels without valid depth values are assumed to lie behind the virtual object. As can be seen from FIG. 20, the bilateral and iterative methods provide reduced MSE when compared with a simple approach.

The present approaches determine blending factor values which indicate the degree to which the colour values at corresponding points in two images are blended. As discussed previously, blending factor values may each indicate the degree of colour blending at a sampling point or within a region. As such, the colour values of each image should correspond with a blending factor value. A plurality of blending factor values may therefore be combined to cover an entire image area, with each blending factor value corresponding to a portion of the image area. In this way, it is possible for a plurality of blending factor values to combine to be form an alpha matte comprising a plurality of alpha matte values. The alpha matte values individually indicate the degree of transparency of a particular image. However, when applied in the present arrangement the alpha matte value can be used to indicate the degree to which each of the first image and the second image are to be combined.

The augmented reality processing system described above can be considered to be a standard graphics processing system configured for augmented reality applications. Alternatively, the augmented reality processing system can be considered to be a separate system arranged for the purposes of augmented reality image generation.

In the examples described herein, the comparison of depth values has been such that a first object having lower depth value at a sample point than a second object means the first object is closer to the viewpoint from which the augmented reality image is to be generated. However, in other arrangements, a first object having lower depth value at a sample point than a second object means the first object is further away from the viewpoint from which the augmented reality image is to be generated. For such arrangements, the calculations used to perform categorisation would be reversed as would be understood by the person skilled in the art.

The examples defined herein generate an augmented reality image, which combines first and second images. At least a portion of either or both of the first and second image includes an image of a real scene. Other portions may include imagery of a virtual scene and/or a virtual object. In the example illustrated herein, the first image is an image of a real scene with no virtual object and the second image is a wholly virtual image of a virtual object. In other implementations, the first and/or the second image may comprise wholly or partially virtual components. It will be appreciated that errors arise where at least a portion of the two images comprises a real captured depth which gives rise to a potential error in the depth measurements.

In an example, an augmented reality video sequence may be generated using the above-described approach of generating an augmented reality image. Specifically, each frame of the augmented reality video may be generated using the method of FIG. 9, where the resultant augmented reality image forms a frame of a video sequence. The first image of the real scene used in the above-described method may therefore be a frame of a video sequence captured of real scene. As such, the resultant augmented reality video sequence may be a video sequence of a real scene in which a virtual object has been inserted.

Figure 21:
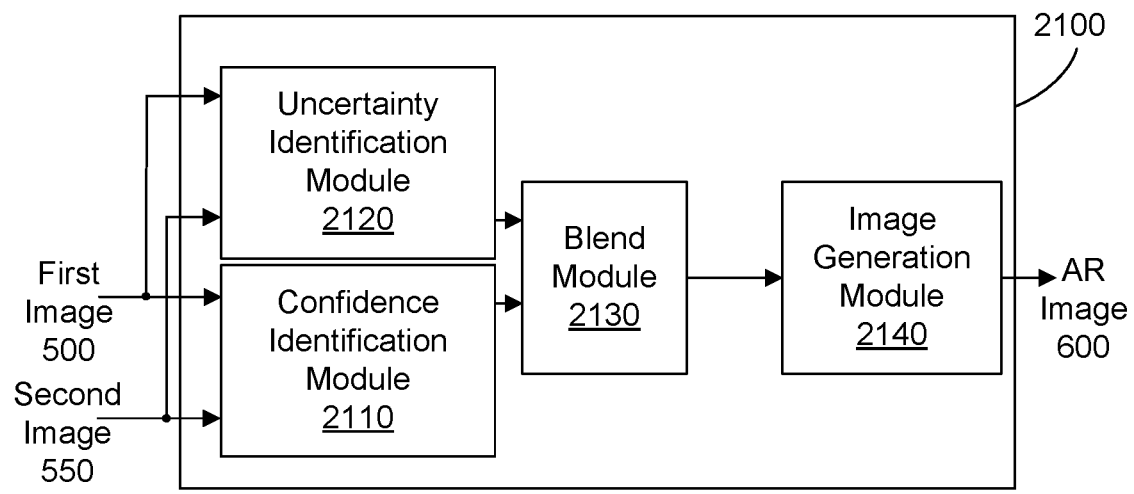
FIG. 21 illustrates example modules of an augmented reality processing system.

FIG. 21 illustrates an augmented reality processing system 2100 comprising a number of modules configured to perform functions according to the methods described herein. The augmented reality processing system 2100 comprises a confidence identification module 2110 configured to receive a first image 500 and a second image 550. The confidence identification module 2110 is configured to identify a confidence region in accordance with the step 920 of the method of FIG. 9. Similarly, the uncertainty identification module 2120 is configured to identify an uncertainty region, for example by performing the step 930 of FIG. 9. Blend module 2130 is configured to determine at least one blending factor value, for example by performing the step 940 of Figure. Image generation module 2140 is configured to generate an augmented reality image 600, for example by combining first 500 and second 550 images in accordance with step 950 of FIG. 9.

The confidence identification module 2110 and the uncertainty identification module 2120 need not be implemented in a parallel manner as is set out in FIG. 21. Instead, the confidence identification module 2110 and the uncertainty identification module 2120 may be implemented in series or in a single module in which the uncertainty and confidence regions are identified as part of the operation of a single module or logical unit.

Figure 22:
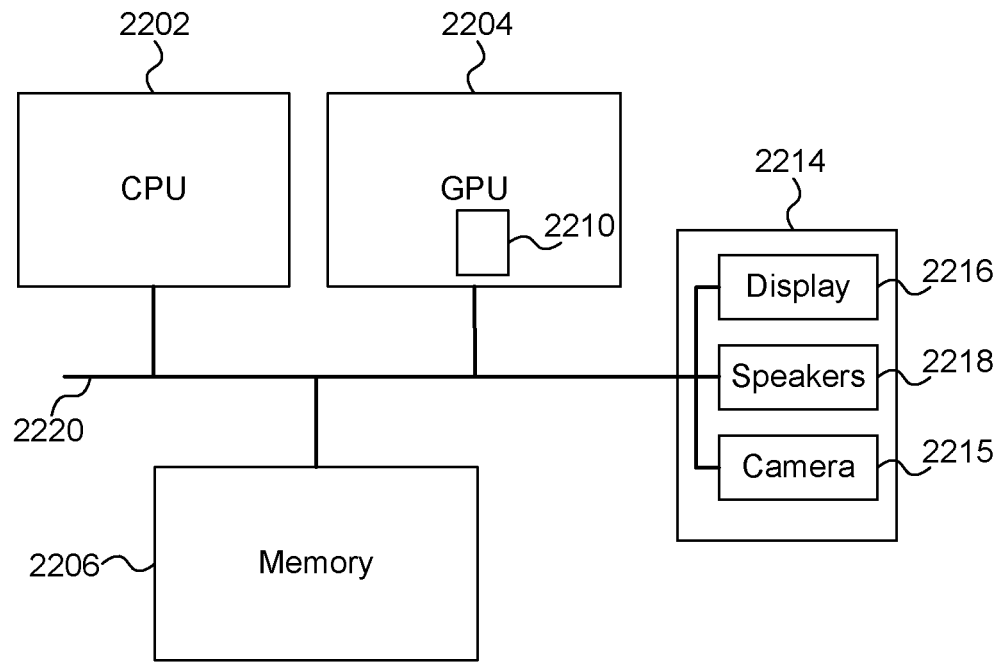
FIG. 22 illustrates a computer system in which the augmented reality processing system described herein may be implemented.

FIG. 22 shows a computer system in which the augmented reality processing systems described herein may be implemented. The computer system comprises a CPU 2202, a GPU 2204, a memory 2206 and other devices 2214, such as a display 2216, speakers 2218 and a camera 2215. A processing block 2210 (corresponding to at least one module of augmented reality processing system 2100) is implemented on the GPU 2204. In other examples, the processing block 2210 may be implemented on the CPU 2202. The components of the computer system can communicate with each other via a communications bus 2220.

The augmented reality processing system 2100 of FIG. 21 is shown as comprising a number of functional blocks. This is schematic only and is not intended to define a strict division between different logic elements of such entities. Each functional block may be provided in any suitable manner. It is to be understood that intermediate values described herein as being formed by an augmented reality processing system need not be physically generated by the augmented reality processing system at any point and may merely represent logical values which conveniently describe the processing performed by the augmented reality processing system between its input and output.

The augmented reality processing systems described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an augmented reality processing system configured to perform any of the methods described herein, or to manufacture an augmented reality processing system comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an augmented reality processing system will now be described with respect to FIG. 23.

Figure 23:
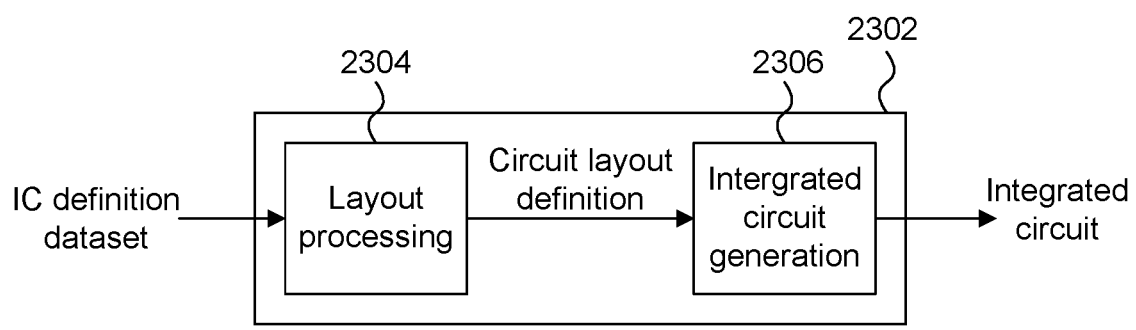
FIG. 23 illustrates an integrated circuit manufacturing system for generating an integrated circuit embodying an augmented reality processing system.

FIG. 23 shows an example of an integrated circuit (IC) manufacturing system 2302 which comprises a layout processing system 2304 and an integrated circuit generation system 2306. The IC manufacturing system 2302 is configured to receive an IC definition dataset (e.g. defining an augmented reality processing system as described in any of the examples herein), process the IC definition dataset, and generate an IC according to the IC definition dataset (e.g. which embodies an augmented reality processing system as described in any of the examples herein). The processing of the IC definition dataset configures the IC manufacturing system 2302 to manufacture an integrated circuit embodying an augmented reality processing system as described in any of the examples herein.

The layout processing system 2304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2304 has determined the circuit layout it may output a circuit layout definition to the IC generation system 2306. A circuit layout definition may be, for example, a circuit layout description.

The IC generation system 2306 generates an IC according to the circuit layout definition, as is known in the art. For example, the IC generation system 2306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2306 may be in the form of computer-readable code which the IC generation system 2306 can use to form a suitable mask for use in generating an IC.

The different processes performed by the IC manufacturing system 2302 may be implemented all in one location, e.g. by one party. Alternatively, the IC manufacturing system 2302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an augmented reality processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 23 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 23, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method for generating a composite image from first and second images, wherein at least a portion of at least one of the first image and second image is captured from a real scene: the first and second images each comprising a first region and a second region; the method comprising:
   I) determining at least one blending factor value, for use in generating a first region of the composite image, based upon a similarity in one of the first and second images between a first value in the first region and a second value in the second region; wherein:
      a) the first region of the composite image corresponds to the respective first regions of each of the first and second image;
      b) a determination as to which of the first and second images to render can be made for a second region of the composite image; the second region of the composite image corresponds to the respective second regions of each of the first and second image; and
   II) generating the composite image by combining, in the first region of the composite image, the first and second images using the at least one blending factor value.

2. The method of claim 1, wherein the first region of the composite image is an uncertainty region in which it is uncertain as to which of the first and second image to render in that region of the composite image.

3. The method of claim 1, wherein the second region of the composite image is a confidence region in which a confident determination as to which of the first and second image to render in that region of the composite image can be made.

4. The method of claim 1, wherein the first and second values are colour values.

5. The method of claim 1, further comprising:
   identifying the first region of the composite image; and
   identifying the second region of the composite image.

6. The method of claim 1, wherein the first image and the second image each have associated therewith a plurality of colour values and a corresponding plurality of depth values, wherein the method further comprises making said determination as to which of the first image and the second image to render based upon a depth value of the first image and the corresponding depth value of the second image in the second region.

7. The method of claim 5, wherein the first image and the second image each have associated therewith a plurality of colour values and a corresponding plurality of depth values, and wherein the first region is identified based upon at least one depth value associated with at least one of the first and the second image, the at least one depth value being derived from a depth value captured from the real scene.

8. The method of claim 1, further comprising generating at least one initial blending factor value in a second region based upon said determination and wherein generating the composite image further comprises combining a corresponding colour value of the first image and a corresponding colour value of the second image in the second region using the at least one initial blending factor value.

9. The method of claim 3, further comprising identifying the confidence region, wherein identifying the confidence region comprises categorising portions of the confidence region as first confidence regions or second confidence regions, wherein:
   first confidence regions are confidence regions in which a colour value of the first image is to be rendered in the corresponding region of the composite image; and
   second confidence regions are confidence regions in which a colour value of the second image is to be rendered in the corresponding region of the composite image.

10. The method of claim 1, wherein determining the at least one blending factor value is further based upon the distance between the position of the first value and the position of the second value.

11. The method of claim 1, wherein the first region, of the at least one of the first image and second image that is captured from a real scene, comprises a plurality of sample points and determining the at least one blending factor value further comprises processing, for each of a plurality of sample points in the said first region, that sample point based upon values at a plurality of sample points located in a second region, of the said at least one of the first image and second image, within a predetermined distance of that sample point.

12. The method of claim 1, wherein determining at least one blending factor value for the first region of the composite image is based upon a similarity is between a colour value in the said first region and at least one corresponding colour value of each of the first image and the second image.

13. The method of claim 1, further comprising performing an erosion operation on the second region of the composite image, wherein the erosion operation is configured to re-categorise at least one portion of the second region of the composite image as forming a part of a first region of the composite image.

14. The method of claim 1, wherein the first image is a captured image of a real scene and the second image is an image of a virtual object.

15. An image processing system for generating a composite image from first and second images, wherein at least a portion of at least one of the first image and second image is captured from a real scene: the first and second images each comprising a first region and a second region; the image processing system comprising:
   I) a blend module arranged to determine at least one blending factor value, for use in generating a first region of the composite image, based upon a similarity in one of the first and second images between a first value in the first region and a second value in the second region; wherein:
      a) the first region of the composite image corresponds to the respective first regions of each of the first and second image;
      b) a determination as to which of the first and second images to render can be made for a second region of the composite image; the second region of the composite image corresponds to the respective second regions of each of the first and second image; and
   II) an image generation module arranged to generate the composite image by combining, in the first region of the composite image, the first and second images using the at least one blending factor value.

16. The image processing system of claim 15, wherein the second region of the composite image is a confidence region in which a confident determination as to which of the first and second image to render in that region of the composite image can be made, and wherein the image processing system further comprises a confidence identification module arranged to identify the confidence region.

17. The image processing system of claim 15, wherein the first region of the composite image is an uncertainty region in which it is uncertain as to which of the first and second image to render in that region of the composite image, and wherein the image processing system further comprises an uncertainty identification module arranged to identify the uncertainty region.

18. The image processing system of claim 15, wherein the first image and the second image each have associated therewith a plurality of colour values and a corresponding plurality of depth values, and wherein the first and second values are colour values.

19. The image processing system of claim 15, wherein the image processing system is embodied in hardware on an integrated circuit.

20. A non-transitory computer readable storage medium having stored thereon computer readable instructions that, when executed at a computer system, cause the computer system to generate a composite image from first and second images, wherein at least a portion of at least one of the first image and second image is captured from a real scene: the first and second images each comprise a first region and a second region; the computer system caused to generate the composite image by:
   I) determining at least one blending factor value, for use in generating a first region of the composite image, based upon a similarity in one of the first and second images between a first value in the first region and a second value in the second region; wherein:
      a) the first region of the composite image corresponds to the respective first regions of each of the first and second image;
      b) a determination as to which of the first and second images to render can be made for a second region of the composite image; the second region of the composite image corresponds to the respective second regions of each of the first and second image; and
   II) generating the composite image by combining, in the first region of the composite image, the first and second images using the at least one blending factor value.

* * * * *